(12) United States Patent
Caplan

(10) Patent No.: US 8,073,342 B2
(45) Date of Patent: Dec. 6, 2011

(54) METHOD AND APPARATUS FOR TRANSMITTING OPTICAL SIGNALS

(75) Inventor: David O. Caplan, Westford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 809 days.

(21) Appl. No.: 12/151,284

(22) Filed: May 5, 2008

(65) Prior Publication Data

US 2008/0285977 A1 Nov. 20, 2008

Related U.S. Application Data

(60) Provisional application No. 60/927,713, filed on May 4, 2007.

(51) Int. Cl.
*H04B 10/04* (2006.01)
(52) U.S. Cl. ...................................... 398/201
(58) Field of Classification Search .............. 398/201
See application file for complete search history.

(56) References Cited

U.S. PATENT DOCUMENTS

| | | | |
|---|---|---|---|
| 5,287,375 A | 2/1994 | Fujimoto |
| 5,394,489 A | 2/1995 | Koch |
| 6,104,516 A | 8/2000 | Majima |
| 6,104,851 A | 8/2000 | Mahgerefteh |
| 6,331,991 B1 | 12/2001 | Mahgerefteh |
| 6,671,079 B2 | 12/2003 | Fuller et al. |
| 6,694,104 B1 | 2/2004 | Caplan et al. |
| 6,816,636 B2 | 11/2004 | Cole et al. |
| 6,940,889 B2 | 9/2005 | Eggleton et al. |
| 6,963,685 B2 | 11/2005 | Mahgerefteh et al. |
| 7,054,538 B2 | 5/2006 | Mahgerefteh et al. |
| 7,116,917 B2 | 10/2006 | Miyamoto et al. |
| 7,181,097 B2 | 2/2007 | Caplan et al. |
| 7,187,821 B2 | 3/2007 | Matsui et al. |
| 7,233,430 B2 | 6/2007 | Caplan |
| 7,263,291 B2 | 8/2007 | Mahgerefteh et al. |
| 7,280,721 B2 | 10/2007 | McCallion et al. |
| 7,414,728 B2 | 8/2008 | Caplan |
| 2004/0071474 A1 | 4/2004 | Shimomura et al. |
| 2006/0139735 A1 | 6/2006 | Caplan |
| 2006/0274320 A1 | 12/2006 | Caplan |

OTHER PUBLICATIONS

Liu, F., et al., "Experimental Verification of a New Model Describing the Influence of Incomplete Signal Extinction Ratio on the Sensitivity Degradation Due to Multiple Interferometric Crosstalk," *IEEE Photon. Technol. Lett.*, 11(1): 137-139 (Jan. 1999).
Li, Z., et al., "Extinction Ratio Effect for High-Speed Optical Fiber Transmissions," *Int. Conf. on Comm. Tech. (ICCT '98)*, S35-02-1-S35-02-5 (Oct. 1998).
S. B. Alexander, *Optical Communication Receiver Design.* Bellingham, Washington, USA: SPIE Optical Engineering Press, pp. v-vi, 222-223 and 248-283, (1997).

(Continued)

*Primary Examiner* — Leslie Pascal
(74) *Attorney, Agent, or Firm* — Hamilton, Brook, Smith & Reynolds, P.C.

(57) ABSTRACT

The present invention addresses the problem of transmitting optical signals with high extinction ratios using low-power drive signals. At present, low-power optical transmitters typically operate with modulation extinction ratios of, at best, about 10 dB. Embodiments of the present invention may achieve extinction ratios exceeding 20 dB using low-power drive signals of under 20 mW at data rates on the order of Gbits/sec. In addition, the modulation may be achieved with both low-power and low-fidelity drive waveforms, enabling conventional and often noisy high-speed, low-power electronics to generate high-extinction, high-fidelity optical waveforms.

48 Claims, 18 Drawing Sheets

OTHER PUBLICATIONS

Pauer, M., et al., "Impact of Extinction Ratio on Return-to-Zero Coding Gain in Optical Noise Limited Receivers," *IEEE Photon. Technol. Lett.*, 15(6): 879-881 (Jun. 2003).

Kim, H., et al., "Chirp Characteristics of Dual-Drive Mach-Zehnder Modulator with a Finite DC Extinction Ratio," *IEEE Photonics Tech. Lett.*, 14(3): 298-300 (Mar. 2002).

Caplan, D. O., et al., "Demonstration of 2.5-Gslot/s Optically-Preamplified M-PPM with 4 photons/bit receiver Sensitivity," *OFC 2005*: Paper PDP32 (Mar. 2005).

Caplan, D. O., "A Technique for Measuring and Optimizing Modulator Extinction Ratio," *CLEO*, pp. 335-336 (May 2000).

Caplan, D. O., "Laser Communication Transmitter and Receiver Design," *J. Opt. Fiber. Commun.*, Rep. 4, 225-362 (Sep. 2007).

Spellmeyer, N. W., et al., "Design of a 5-Watt PPM Transmitter for the Mars Laser Communications Demonstration," *2005 Digest of the LEOS Summer Topical Meetings*, pp. 51-52 (Jan. 2005).

Kawanishi, T., et al., "70dB Extinction-Ratio $LiNbO_3$ Optical Intensity Modulator for Two-Tone Lightwave Generation," *OFC 2006*, (Mar. 2006).

Vodhanel, R. S., et al., "Ten-to-Twenty Gigabit-per-Second Modulation Performance of 1.5-μm Distributed Feedback Lasers for Frequency-Shift-Keying Systems," *J. Lightwave Tech.*, 7(10): 1454-1460 (Oct. 1989).

Mahgerefteh, D., et al., "Penalty-Free Propagation over 600 km of Non-dispersion-shifted Fiber at 2.5 Gb/s Using a Directly Laser Modulated Transmitter," *CLEO*, p. 182 (May 1999).

Chandrasekhar, S., et al., "Repeaterless Transmission With Negative Penalty Over 285 km at 10 Gb/s Using a Chirp Managed Laser," *IEEE Photonics Tech. Lett.*, 17(11): 2454-2456 (Nov. 2005).

Chandrasekhar, S., et al., "Chirp-Managed Laser and MLSE-RX Enables Transmission Over 1200 km at 1550 nm in a DWDM Environment in NZDSF at 10 Gb/s Without Any Optical Dispersion Compensation" *IEEE Photonics Tech. Lett.*, 18(14): 1560-1562 (Jul. 2006).

Matsui, Y., et al., "Chirp-Managed Directly Modulated Laser (CML)," *Photonics Tech. Lett.*, 18(2): 385-387 (Jan. 2006).

Vodhanel, R. S., et al., "Performance of Directly Modulated DFB Lasers in 10-Gb/s ASK, FSK, and DPSK Lightwave Systems," *J. Lightwave Tech.*, 8(9): 1379-1386 (Sep. 1990).

Morton, P. A., et al., "38.5 km Error Free Transmission at 10 Gbit/s in Standard Fibre Using a Low Chirp, Spectrally Filtered, Directly Modulated 1.55μm DFB laser," *Electron. Lett.*, 33(4): 310-311 (Feb. 1997).

Nowell, M. C., et al., "Low-Chirp and Enhanced-Resonant Frequency by Direct Push-Pull Modulation of DFB Lasers," *IEEE J. of Selected Topics in Quantum Electron.*, 1(2): 433-441 (Jun. 1995).

Finisar, "10Gb/s 200km Telecom CML™ 13pin-GPO Butterfly Transmitter", *Product Specification*, pp. 1-10 (May 2007).

Caplan, D. O., et al., "High-Sensitivity Multi-Channel Single-Interferometer DPSK Receiver," *Optics Express*, 14(23): 10984-10989 (Nov. 2006).

Caplan, D. O., et al., "High-Sensitivity Demodulation of Multiple-Data-Rate WDM-DPSK Signals Using a Single Interferometer," *OFC 2007* (Mar. 2007).

Sakamoto, T., et al., "Optoelectronic Oscillator Using $LiNbO_3$ Intensity Modulator with Resonant Electrode," *Electronics Letters*, 41(12), (Jun. 2005).

Krähenbühl, R., et al., "High-Speed Optical Modulator in $LiNbO_3$ With Cascaded Resonant-Type Electrodes," *J. Lightwave Tech.*, 24(5): 2184-2189 (May 2006).

Yanagase, Y., et al., "Box-Like Filter Response and Expansion of FSR by a Vertically Triple Coupled Microring Resonator Filter," *J. Lightwave Technology*, 20(8): 1525-1529 (Aug. 2002).

Little, B. E., et. al., "Very High-Order Microring Resonator Filters for WDM Applications," *IEEE Photonics Tech. Lett*, 16(10): 2263-2265 (Oct. 2004).

Chu, S. T., et al., Cascaded Microring Resonators for Crosstalk Reduction and Spectrum Cleanup in Add-Drop Filters, *IEEE Photon. Tech. Lett.*, 11(11): 1423-1425 (Nov. 1999).

Kim. S. K., et al., "Theoretical and Experimental Study of 10 Gb/s Transmission Performance Using 1.55 μm $LiNbO_3$-Based Transmitters with Adjustable extinction ratio and Chirp," *J. of Lightwave Tech.*, 17(8): 1320-1325 (Aug. 1999).

Courjal, N., et al., "Extinction-ratio-independent method for chirp measurements for Mach-Zehnder modulators," *Optics Express*, 12(3): 442-448 (Feb. 2004).

Mahgerefteh, D., et al., "Tunable Chirp Managed Laser," *IEEE Photonics Tech. Lett.*, 20(2): 108-110 (Jan. 2008).

Mahgerefteh, D., et al., "Elimination of Pattern Dependence in a Semiconductor-Optical-Amplifier Wavelength Converter Using a Fiber Grating," *ECOC '97*, Conference Pub. No. 448, pp. 273-276 (Sep. 1997).

Vodhanel, R. S., "5 Gbit/s Direct Optical DPSK Modulation of a 1530-nm DFB Laser," *IEEE Photonics Tech. Lett.*, 1(8): 218-220 (Aug. 1989).

Mahgerefteh, D., et al., "Chirp-managed-laser technology delivers > 250-km reach," *Lightwave Online*, (Sep. 2005).

International Preliminary Report on Patentability and Written Opinion, PCT/US2008/005759, mailing date Nov. 19, 2009.

Hanfoug, L. M., et al., "Static Extinction Ratio Bandwidth of Mach-Zehnder Interferometer Wavelength Converters," *IEEE*, pp. 73-76 (2003).

Madsen, C. K. and Lenz, G., "Optical All-Pass Filters for Phase Response Design with Applications for Dispersion Compensation," *IEEE Photonics Technology Letters*, 10:7(994-996), (Jul. 1998).

Jan. 30, 2009, International Search Report and Written Opinion of the International Searching Authority, PCT/US2008/005759.

METHOD AND APPARATUS FOR TRANSMITTING OPTICAL SIGNALS

RELATED APPLICATION

This application claims the benefit of U.S. Provisional Application No. 60/927,713, filed on 4 May 2007. The entire teachings of the above application are incorporated herein by reference.

GOVERNMENT SUPPORT

The invention was supported, in whole or in part, by a grant under Contract No. FA8721-05-C-0002 from the United States Air Force. The Government has certain rights in the invention.

BACKGROUND OF THE INVENTION

It is well known that good modulation extinction ratio waveforms are necessary for power-efficient implementations of optical transmitters (TXs) and receivers (RXs) for many reasons. Extinction ratio (ER), defined as the power off-to-on ratio, determines the initial distance between logical '0' and '1' power levels in on-off keying (OOK) modulation and may lead to multiple interferometric cross talk, which adversely impacts both time-division-multiplexed (TDM) and WDM systems (L. Fenghai, C. J. Rasmussen, and R. J. S. Pedersen, "Experimental verification of a new model describing the influence of incomplete signal extinction ratio on the sensitivity degradation due to multiple interferometric crosstalk," *IEEE Photon. Technol. Lett.*, vol. 11, p. 137, January 1999; Z. Li, Y. He, B. F. Jorgensen, and R. J. Pedersen, "Extinction ratio effect for high-speed optical fiber transmissions," in *Int. Conf on Comm. Tech. Proc. (ICCT '98)*, 1998). Moreover, incomplete ER significantly degrades the sensitivity in optically preamplified receivers (S. B. Alexander, *Optical communication receiver design.* Bellingham, Wash., USA: SPIE Optical Engineering Press, 1997; M. Pauer and P. J. Winzer, "Impact of Extinction Ratio on Return-to-Zero Coding Gain in Optical Noise Limited Receivers," *IEEE Photon. Technol. Lett.*, vol. 15, pp. 879-881, June 2003; H. Kim and A. H. Gnauck, "Chirp characteristics of dual-drive mach-zehnder modulator with a finite dc extinction ratio," *IEEE Photonics Tech. Lett.*, vol. 14, March 2002; D. O. Caplan, B. S. Robinson, R. J. Murphy, and M. L. Stevens, "Demonstration of 2.5-Gslot/s optically-preamplified M-PPM with 4 photons/bit receiver sensitivity," in *OFC*: Paper PDP23, 2005; D. O. Caplan, "A technique for measuring and optimizing modulator extinction ratio," in *CLEO*, 2000).

For example, a 10 dB ER causes ~3 dB signal-to-noise ratio (SNR) penalty, which, in turn, may reduce the maximum link distance between repeaters or regenerators in fiber-optic applications by a factor of two. An ER better than 20 dB is needed to limit sensitivity penalties to <~0.7. When using low-duty-cycle-M-ary orthogonal modulation formats (e.g., M-PPM), the ER must be >~15 dB higher than M to avoid performance penalties. For example, a 128-PPM TX with a 20 dB ER incurs a transmitter power penalty exceeding 3 dB. This penalty is reduced to ~0.1 dB for a 36 dB ER.

There are several conventional approaches used to generate intensity modulated optical signals, but all suffer from limitations in speed, ER, and/or power efficiency. To achieve high ER, external modulators, such as electro-absorption (EA) and Mach-Zehnder modulators (MZMs), are typically employed (sometimes in cascade (D. O. Caplan, B. S. Robinson, R. J. Murphy, and M. L. Stevens, "Demonstration of 2.5-Gslot/s optically-preamplified M-PPM with 4 photons/bit receiver sensitivity," in *OFC*: Paper PDP23, 2005; N. W. Spellmeyer, D. O. Caplan, and M. L. Stevens, "Design of a 5-Watt PPM transmitter for the Mars Laser Communications Demonstration," in *LEOS*, 2005) or in parallel (T. Kawanishi, T. Sakamoto, M. Tsuchiya, and M. Izutsu, "70 dB extinction-ratio LiNbO3 optical intensity modulator for two-tone lightwave generation," in *OFC,* 2006)), at the expense of increased complexity, component count, and power consumption. While MZMs are often wide band, they are generally polarization dependent, require bias control, and are lossy, increasing transmission (TX) insertion loss by typically 3 to 6 dB. They also have switching voltages of 3 to 6 V, which requires power-hungry external driver amplifiers that typically consume 2 to 5 W of electrical power. EAs are smaller and typically require 3 V drive (60 mA through 50Ω), but only achieve ER>~10 dB. Higher ER may be achieved with EAs, but at the cost of additional drive voltage and power.

Conventional direct-drive laser current modulation sources, also referred to as a directly modulated lasers (DMLs), are widely used for their cost and simplicity, but typically achieve ER<10 dB and require large drive current, typically ~100 mA. This requires 5 V drive to accommodate a standard 50Ω load impedance, which precludes the use of standard low-power logic gates for applications at Gbit/s rates. More recently, direct-drive laser techniques in conjunction with optical filtering have been employed to reduce drive power requirements and improve waveform fidelity and ER (R. S. Vodhanel, A. F. Elrefaie, R. E. Wagner, M. Z. Iqbal, J. L. Gimlett, and S. Tsuji, "Ten-to-Twenty Gigabit-per-Second Modulation Performance of 1.5-pm Distributed Feedback Lasers for Frequency-Shift Keying Systems," *J. Lightwave Tech.*, vol. 7, pp. 1454-1460, October 1989; D. Mahgerefteh, P. S. Cho, J. Goldhar, and H. I. Mandelberg, "Penalty-free propagation over 600 km of nondispersionshifted fiber at 2.5 Gb/s using a directly laser modulated transmitter," in *CLEO,* 1999; S. Chandrasekbar, C. R. Doerr, L. L. Buhl, Y. Matsui, D. Mahgerefteh, X. Zheng, K. McCallion, Z. Fan, and P. Tayebati, "Repeaterless Transmission With Negative Penalty Over 285 km at 10 Gb/s Using a Chirp Managed Laser," *Photonics Tech. Lett.*, vol. 17, pp. 2454-2457, November 2005; S. Chandrasekbar, A. H. Gnauck, G. Raybon, L. L. Buhl, D. Mahgerefteh, X. Zheng, Y. Matsui, K. McCallion, Z. Fan, and P. Tayebati, "Chirp-Managed Laser and MLSE-RX Enables Transmission Over 1200 km at 1550 nm in a DWDM Environment in NZDSF at 10 Gb/s Without Any Optical Dispersion Compensation" *Photonics Tech. Lett.*, vol. 18, pp. 1560-1562, July 2006; Y. Matsui, D. Mahgerefteh, X. Zheng, C. Liao, Z. F. Fan, K. McCallion, and P. Tayebati, "Chirp-Managed Directly Modulated Laser (CML)," *Photonics Tech. Lett.*, vol. 18, pp. 385-386, January 2006; R. S. Vodhanel, A. F. Elrefaie, M. Z. Iqbal, R. E. Wagner, J. L. Gimlett, and S. Tsuji, "Performance of directly modulated DFB lasers in 10-Gb/s ASK, FSK, and DPSK lightwave systems," *J. Lightwave Tech.*, vol. 8, pp. 1379-1386, 1990). However, the best reported ER with these approaches is <14 dB (D. Mahgerefteh, P. S. Cho, J. Goldhar, and H. I. Mandelberg, "Penalty-free propagation over 600 km of nondispersion shifted fiber at 2.5 Gb/s using a directly laser modulated transmitter," in *CLEO,* 1999; S. Chandrasekbar, C. R. Doerr, L. L. Buhl, Y. Matsui, D. Mahgerefteh, X. Zheng, K. McCallion, Z. Fan, and P. Tayebati, "Repeaterless Transmission With Negative Penalty Over 285 km at 10 Gb/s Using a Chirp Managed Laser," *Photonics Tech. Lett.*, vol. 17, pp. 2454-2457, November 2005; S. Chandrasekbar, A. H. Gnauck, G. Raybon, L. L. Buhl, D. Mahgerefteh, X. Zheng, Y. Matsui, K. McCallion, Z. Fan, and P. Tayebati, "Chirp-Managed Laser and MLSE-RX Enables Transmission Over 1200 km at 1550 nm in a DWDM Environment in NZDSF at 10 Gb/s Without Any Optical Dispersion Compensation" *Photonics Tech. Lett.*, vol. 18, pp. 1560-1562, July 2006; P. A. Morton, G. E. Shtengel, L. D. Tzeng, R. D. Yadvish, T. Tanbun-Ek, and R. A. Logan, "38.5 km error free transmission at 10 Gbit/s in standard fibre using a low chirp, spectrally filtered, directly modulated 1.55 μm DFB laser," *Electron. Lett.*, vol. 33, pp. 310-311, 1997; M. C. Nowell, J. E. Carroll, R. G. S. Plumb, D. D. Marcenac, M. J. Roberston, H. Wickes, and L. M. Zhang, "Low-Chirp and Enhanced-Resonant Frequency by Direct Push-pull Modulation of DFB Lasers," *IEEE Sel. Top. J. Quantum Electron.*, vol. 1, pp. 433-441, June 1995). Filtered DMLs with lower drive voltage of 0.5 to 1.5 V are commercially available, but guarantee only 9 dB ER (Finisar, "10 Gb/s 200 km Telcom CML 13 pin-GPO Butterfly Transmitter," Product Specification 2007).

SUMMARY OF THE INVENTION

An example embodiment of the present invention comprises an optical transmitter that includes a directly modulated, or driven laser and a filter that acts on an output signal from the laser. A drive signal, characterized by a pulse duration and signal power, modulates the laser to control the wavelength shift and power of the output signal. The filter transmits the output signal according to a free spectral range (FSR), which is greater than a reciprocal of the pulse duration and approximately twice a frequency shift of the output signal caused by the drive signal.

In example embodiments, the FSR depends on the drive signal and electrical and optical characteristics of the laser. The filter may have a rejection bandwidth equal to a first percentage of the FSR (e.g., <6% of the FSR) and a pass bandwidth equal to a second percentage of the FSR (e.g., >6% of the FSR). Some embodiments may have filters with rejection bandwidths of at least 20 dB with a first percentage (e.g., >20%) of the FSR and at least a 0.2 dB pass bandwidth with a second percentage of the FSR.

Example embodiments of the present invention may include multi-pass optical delay line interferometers, arrayed waveguide gratings (AWGs), fiber Bragg gratings (FBGs), or any other suitable filter or combination thereof as optical filters. Filters comprising multi-pass optical delay line interferometers may include single-pass delay lines, reflecting elements, reflecting elements that include Faraday rotation elements, and quadruple-pass optical delay line interferometers. Carvers may operate on outputs of the filter as well.

In example embodiments, the laser may be a semiconductor laser. The output signal may also be polarized with a single polarization.

Pilot tones may be used to control an alignment of the output wavelength and a pass band of the filter. Certain embodiments may be configured to control an alignment of the output wavelength and a pass band of the filter using a pilot tone. Other embodiments may be configured to control an alignment of an on-state wavelength and a pass band of the filter, and an off-state wavelength and a rejection band of the filter using a dither of the drive signal or bias current as feedback to adjust the drive signal power and bias current.

Example embodiments may demonstrate extinction ratios (ERs) of better than 20 dB (1:100), where ER is the ratio of "on" to "off" output power. In embodiments, the switching power of the drive signal may be less than 20 mW.

In some embodiments, the laser may comprise plural lasers, each configured to emit light at one of a plurality of wavelengths. In still other embodiments, the ER for each laser may be less than −20 dB; in further embodiments, an average switching power of the drive signal is less than 20 mW. In embodiments comprising multiple lasers, the drive signal may have a power proportional to a product of a number of the lasers and a maximum voltage squared of the drive signal, where the voltage may be set to a predetermined level.

In embodiments comprising plural lasers, the lasers may be configured to be dynamically or selectably activated. Similarly, the plural lasers may be configured to each transmit different data or the same data. Alternatively, different subsets of lasers may transmit the same or different data. In some embodiments, the data transmission configuration may be a function of channel characteristics through which the output signal is to be transmitted.

Embodiments of the present invention may be configured to transmit On-Off Keying (OOK), M-ary Pulse Position Modulation (M-PPM), M-ary Frequency Shift Keying (M-FSK), PoLSK Polarization-shift keying, M-ary orthogonal, and M-Differential Phase Shift Keying (M-DPSK), or variable duty cycle waveforms.

For embodiments comprising plural lasers, the lasers may be aligned to individual filter passbands by tuning the filter to compensate for wavelength drift of the lasers due to temperature changes, for example. In certain embodiments, the filter may be configured to be tuned by approximately 0.1 nm/deg C ambient change.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The teachings of all patents, published applications and references cited herein are incorporated by reference in their entirety.

1 General Description

An example embodiment of the present invention achieves good Extinction Ratio (ER) and low switching voltage by using filtered direct-drive modulation techniques in which conventional high-speed laser diodes, such as distributed feedback (DFB) lasers, distributed Bragg reflector (DBR) lasers, or vertical-cavity surface-emitting lasers (VCSELs), are modulated directly to produce an optical signal. The optical signal is subsequently filtered with an optical filter, as shown in the example embodiment depicted in FIG. 1C.

Combining direct-drive laser modulation and optical filtering, as in embodiments of the present invention, may significantly lower power, complexity, and losses associated with generating wide-band-modulated optical signals of various modulation types with fidelity suitable for near-quantum-limited receiver performance. Furthermore, embodiments of the present invention may be scaled to higher data rates using wavelength division multiplexing (WDM) technologies, providing an efficient means of generating high-fidelity, high-modulation extinction ratio optical signals at high data rates, e.g., at rates up to the Gbit/s regime and beyond.

Modulation may be achieved with or without external modulation, which in the case of having no external modulations, significantly reduces power and waveform fidelity requirements of drive electronics, allowing high-extinction optical waveforms to be generated directly from low-fidelity, low-voltage electrical signals. Embodiments of the present invention may enable use of standard and often noisy, high-speed, low-power, logic gates as drivers, allowing for non-power-hungry driver amplifiers. Embodiments may also leverage commercially available high-speed laser diodes and optical filter technologies to generate intensity modulated optical signals with high ER and low switching power suitable for use in high-performance optical communication applications.

Figure 2:
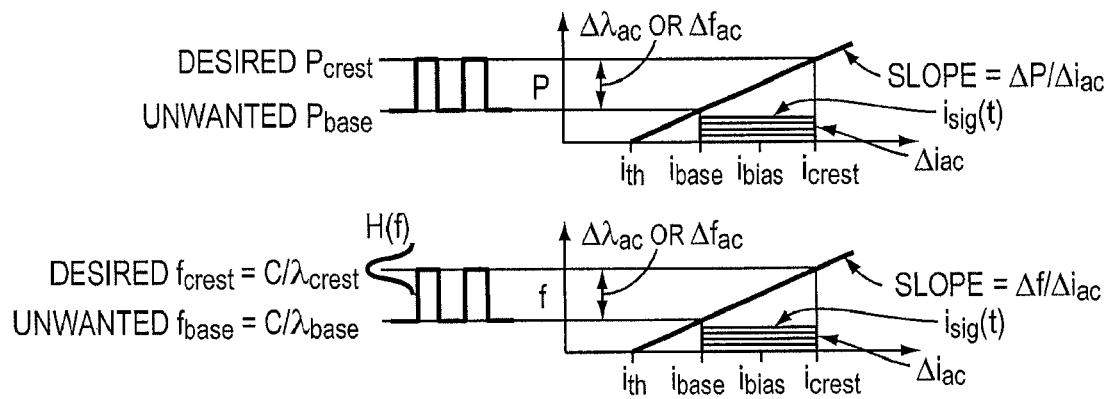
FIG. 2 is a pair of graphs that illustrate a mapping of bias and drive signal current to output signal wavelength and power for an optical transmitter according to an embodiment of the present invention.
Figure 3:
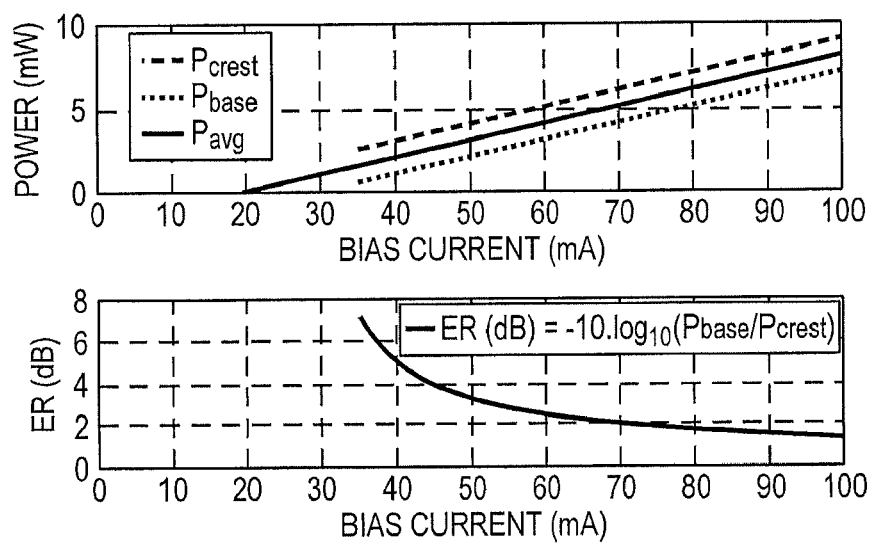
FIG. 3 is a pair of graphs that illustrate the mapping of laser bias current to output signal power and extinction ratio for an optical transmitter according to an embodiment of the present invention.
Figure 4:
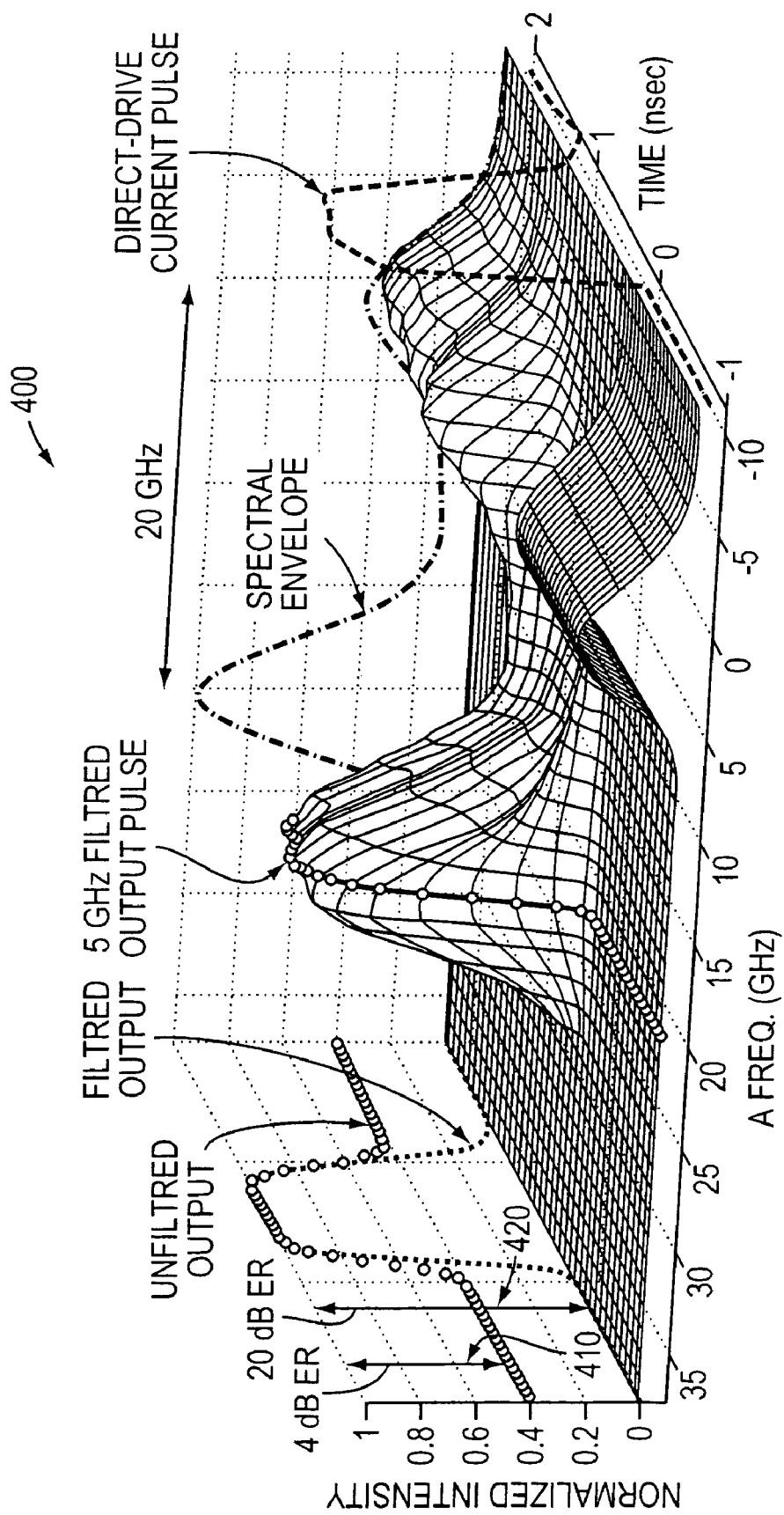
FIG. 4 is a spectrogram that illustrates the time and frequency dependence of output power for an optical transmitter according to an embodiment of the present invention.

In the example embodiments shown in FIGS. 2-4, the optical signal contains both amplitude modulation (AM) and frequency modulation (FM). Embodiments may use optical signals with a linearly increasing phase, otherwise known as chirped signals (R. S. Vodhanel, A. F. Elrefaie, R. E. Wagner, M. Z. Iqbal, J. L. Gimlett, and S. Tsuji, "Ten-to-Twenty Gigabit-per-Second Modulation Performance of 1.5-pm Distributed Feedback Lasers for Frequency-Shift Keying Systems," *J. Lightwave Tech.*, vol. 7, pp. 1454-1460, October 1989; D. Mahgerefteh, P. S. Cho, J. Goldhar, and H. I. Mandelberg, "Penalty-free propagation over 600 km of nondispersion shifted fiber at 2.5 Gb/s using a directly laser modulated transmitter," in *CLEO*, 1999; S. Chandrasekbar, C. R. Doerr, L. L. Buhl, Y. Matsui, D. Mahgerefteh, X. Zheng, K. McCallion, Z. Fan, and P. Tayebati, "Repeaterless Transmission With Negative Penalty Over 285 km at 10 Gb/s Using a Chirp Managed Laser," *Photonics Tech. Lett.*, vol. 17, pp. 2454-2457, November 2005; S. Chandrasekbar, A. H. Gnauck, G. Raybon, L. L. Buhl, D. Mahgerefteh, X. Zheng, Y. Matsui, K. McCallion, Z. Fan, and P. Tayebati, "Chirp-Managed Laser and MLSE-RX Enables Transmission Over 1200 km at 1550 nm in a DWDM Environment in NZDSF at 10 Gb/s Without Any Optical Dispersion Compensation" *Photonics Tech. Lett.*, vol. 18, pp. 1560-1562, July 2006; Y. Matsui, D. Mahgerefteh, X. Zheng, C. Liao, Z. F. Fan, K. McCallion, and P. Tayebati, "Chirp-Managed Directly Modulated Laser (CML)," *Photonics Tech. Lett.*, vol. 18, pp. 385-386, January 2006; R. S. Vodhanel, A. F. Elrefaie, M. Z. Iqbal, R. E. Wagner, J. L. Gimlett, and S. Tsuji, "Performance of directly modulated DFB lasers in 10-Gb/s ASK, FSK, and DPSK lightwave systems," *J. Lightwave Tech.*, vol. 8, pp. 1379-1386, 1990; P. A. Morton, G. E. Shtengel, L. D. Tzeng, R. D. Yadvish, T. Tanbun-Ek, and R. A. Logan, "38.5 km error free transmission at 10 Gbit/s in standard fibre using a low chirp, spectrally filtered, directly modulated 1.55 µm DFB laser," *Electron. Lett.*, vol. 33, pp. 310-311, 1997; M. C.

Nowell, J. E. Carroll, R. G. S. Plumb, D. D. Marcenac, M. J. Roberston, H. Wickes, and L. M. Zhang, "Low-Chirp and Enhanced-Resonant Frequency by Direct Push-pull Modulation of DFB Lasers," *IEEE Sel. Top. J. Quantum Electron.*, vol. 1, pp. 433-441, June 1995).

Figure 5:
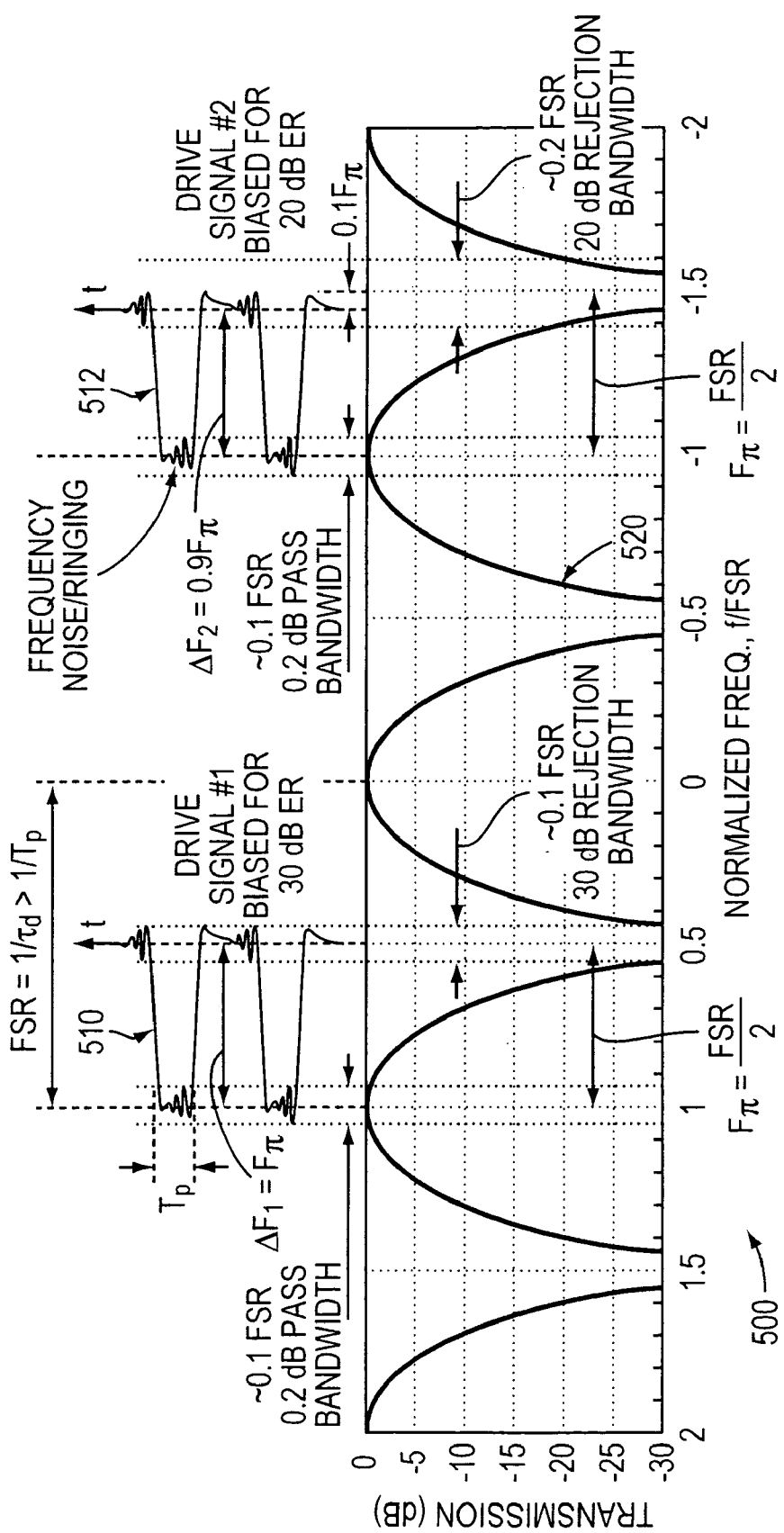
FIG. 5 is schematic diagram that shows the relationship between output signal wavelength, filter free spectral range (FSR), and extinction ratio for an optical transmitter according to an embodiment of the present invention.

In example embodiments of the present invention, the filtering is performed with a filter that performs an FM to AM conversion with improved ER>20 dB, achieved by transmission through broad filter transmission peaks and nulls, as shown in FIG. 5. When followed by an average power limited amplifier, this combination may be used as a power efficient source of high-fidelity transmit waveforms despite filter losses (U.S. Provisional Application No. 60/927,713; D. O. Caplan, M. L. Stevens, and D. M. Boroson, "Variable-rate communication system with optimal filtering," U.S. Pat. No. 6,694,104).

Example embodiments comprise an optical filter tailored to provide a nonlinear output as a function of the input wavelength. Nonlinear outputs reduce the impact of noise or ringing on both logical zero and one drive levels (also shown in FIG. 5) so that the resulting digital output signal may have better ER and fidelity (i.e., less noise and ringing) than the input. Combining noise suppression with low-drive voltage and current switching requirements (e.g., less than ~1 V and 20 mA at 50Ω) enables the use of standard and often noisy high-speed logic gates as driver circuitry without significant loss of fidelity, simplifying the transmitter design and eliminating the need for external modulators and high-power driver amplifiers. This reduces size, weight, and power (SWAP) and cost of high-performance laser communication systems, especially those employing wavelength division multiplexing (WDM).

Periodic filters, including those with sharp nonlinear features may be used in example embodiments, enabling single-filter solutions to multi-channel WDM-type transmitters and receivers with nearly matched communication performance. This means that embodiments of the present invention may be used as cost-efficient and scaleable method of implementing size, weight, power, and photon-efficient designs capable of transmitting a variety of parallelizable modulation formats— which may be reconfigured dynamically to accommodate particular channel conditions or bandwidth constraints or requirements. Such features may enable more sophisticated free-space-based laser communications (lasercom) transmitters with improved reliability.

Embodiments of the present invention may be used in future free-space and WDM-based fiber-optic networks. Embodiments support a wide variety of modulation formats, including On-Off Keying (OOK), M-ary Pulse Position Modulation (M-PPM), Mary Frequency Shift Keying (M-FSK), PoLSK Polarization-shift keying, M-ary orthogonal, and M-Differential Phase Shift Keying (M-DPSK).

2 Advantages of Example Embodiments

Example embodiments of the present invention provide an improved low-power means of generating high-fidelity, intensity-modulated or wavelength-switched optical signals compatible with good receiver sensitivities. Replacing a conventional continuous-wave (CW) laser and external modulation with filter-based modulation achieves the same or better performance without requiring high-fidelity low-noise input signals. This enables standard low-power and potentially noisy logic gates to be used to directly drive the optical transmitter without significant loss of waveform fidelity or ER.

Increased modulation extinction and stability, and reduced complexity, enable more sophisticated modulation while reducing size, weight, and power (SWAP), and component count, especially when implemented with scaleable implementations in the transmitter and receiver. This, in turn, improves overall reliability. Embodiments of the present invention are particularly well suited for implementing dynamically reconfigurable transmitters (TXs) and receivers (RXs). Such TXs and RXs may be adjusted to accommodate varying channel conditions and/or data-rate requirements, providing flexibility and scalability that enables a single transceiver design to be used for a wide variety of applications.

Relative to high-rate externally modulated transmitters, the direct-drive filter-based transmitter described above provides comparable or better extinction with improved stability and lower power, complexity, and cost. Relative to other filter-based transmitters, embodiments of the present invention provide a high-extinction-ratio solution that can be extended to accommodate many wavelengths and modulation formats (S. Chandrasekbar, C. R. Doerr, L. L. Buhl, Y. Matsui, D. Mahgerefteh, X. Zheng, K. McCallion, Z. Fan, and P. Tayebati, "Repeaterless Transmission With Negative Penalty Over 285 km at 10 Gb/s Using a Chirp Managed Laser," *Photonics Tech. Lett.*, vol. 17, pp. 2454-2457, November 2005; S. Chandrasekbar, A. H. Gnauck, G. Raybon, L. L. Buhl, D. Mahgerefteh, X. Zheng, Y. Matsui, K. McCallion, Z. Fan, and P. Tayebati, "Chirp-Managed Laser and MLSE-RX Enables Transmission Over 1200 km at 1550 nm in a DWDM Environment in NZDSF at 10 Gb/s Without Any Optical Dispersion Compensation" *Photonics Tech. Lett.*, vol. 18, pp. 1560-1562, July 2006).

Embodiments of the present invention may be combined with existing direct-drive solutions to improve modulation ER and receiver sensitivity, which, in turn, extends link distances. Furthermore, embodiments of the present invention reduce drive power and tolerate low fidelity electrical drive signals while generating high-fidelity high-ER optical waveforms that are suitable for near-quantum-limited receiver sensitivities using a variety of modulation formats. In addition, embodiments can be used in optical communications systems with similar filters in both transmitter and receiver, reducing the number of system-wide component types and reducing costs associated with inventory and qualification.

Transmitter power savings per channel in a Wavelength Division Multiplexing (WDM) system using embodiments of the present invention is about 3 W per channel relative to conventional externally modulated designs. The switching power of <~20 mW noted above at Gbit/s rates is about an order of magnitude lower than conventional switching power and can take advantage of standard high-speed low-power circuitry. For a 2.5 Gbit/s data rate, this corresponds an upper bound of 8 pJ/bit of switching energy, which may be adjusted to achieve lower switching energies or higher data rates through the use of plural lasers.

Depending on the exact implementation and the number of channels, the cost savings for implementing the transmitter without the need for the external modulator, high-voltage driver, or bias control typically ranges from $1000 to $3000 per channel, yielding substantial cost savings in 100+ channel WDM systems. Reductions in transmitter size and component count along with improved reliability and receiver sensitivity result in a corresponding decrease in development, operation, and implementation expenses. In space-based platforms, where size, weight, and power are critical expenses, generally far greater than the procurement cost, the savings are much greater.

Filter-based direct-drive modulation reduces complexity, component count, power and electronic signal-fidelity requirements. It may also improve extinction ratio and stability while maximizing if possible to eliminate the need for external modulation and maintaining an ability to achieve nearly optimal communication performance. Example embodiments include a single filter, such as a volume or fiber Bragg grating per transmitter. Other embodiments include periodic optical filters, such as Fabry Perot(FP) filters, Delay Line Interferometer (DI) filters, arrayed waveguide-grating (AWG) filters, integrated microring resonator filter, and cascaded and multi-pass combinations of any of the aforementioned filters.

Example embodiments accommodate numerous channels over many THz of bandwidth, providing scalability and allowing the cost of the filtering and stabilization (if needed) to be distributed over many channels (D. O. Caplan, "Multi-channel DPSK Receiver," U.S. patent application Ser. No. 11/022,344; D. O. Caplan, M. L. Stevens, and J. J. Carney, "A High-Sensitivity Multi-Channel Single-Interferometer DPSK Receiver," *Optics Express*, vol. 14, pp. 10984-10989, November 2006; D. O. Caplan, M. L. Stevens, and J. J. Carney, "High-Sensitivity Demodulation of Multiple-Data-Rate WDM-DPSK Signals using a Single Interferometer," in *OFC*, 2007). Still other embodiments include nonlinear filters, such as customized Fiber Bragg Grating (FBG) filters, cascaded, and multi-pass filters. Other embodiments may include reconfigurable filters, polarization independent filters, Polarization Maintaining (PM) filters, and/or single-polarization filters as described in U.S. patent application Ser. No. 11/318,255, filed 23 Dec. 2005. Embodiments may comprise robust, commercially available telecommunication-type technologies, expediting insertion into operational systems.

3 Example Embodiments and Performance Thereof

Figure 1A:
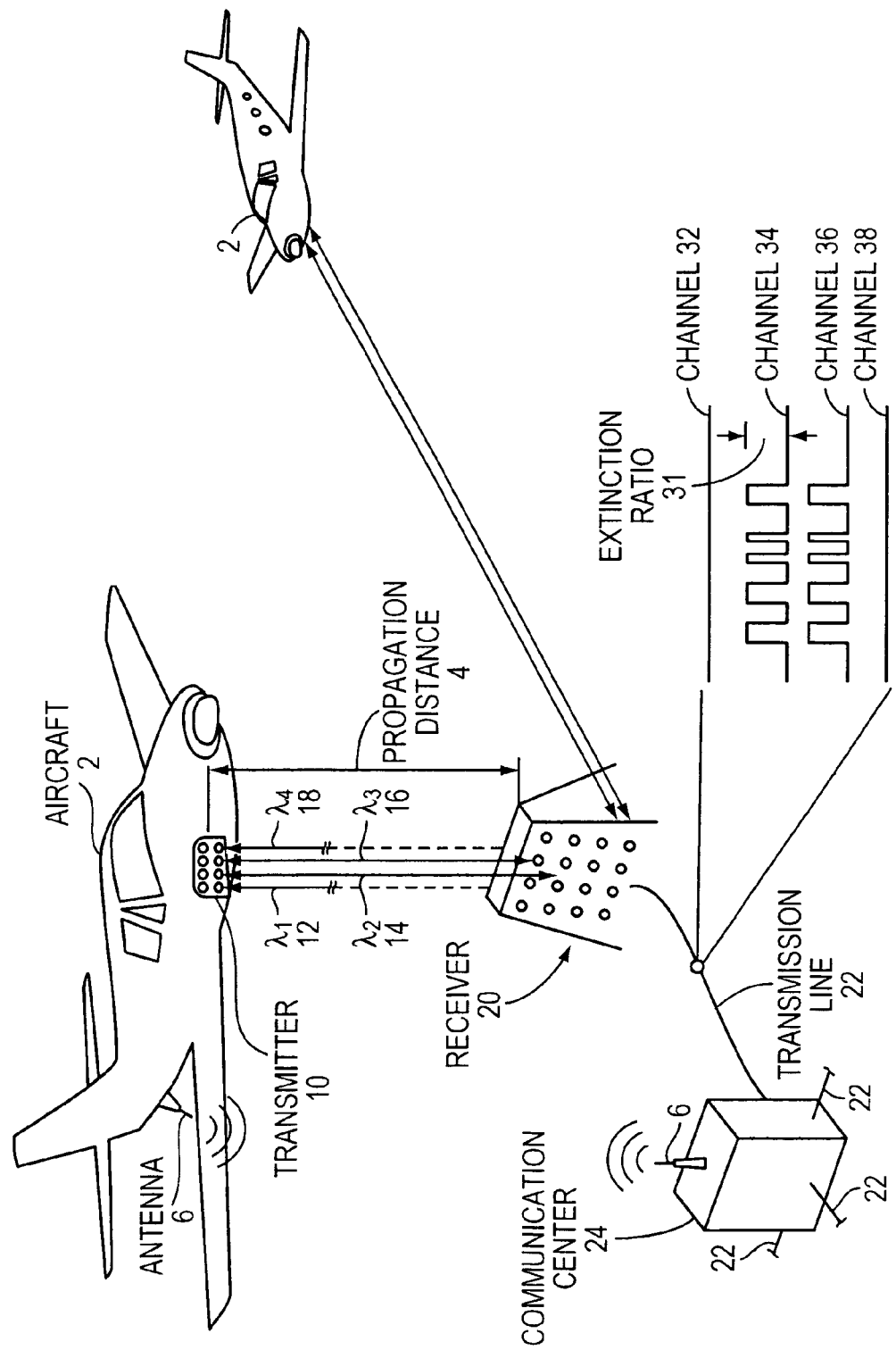
FIGS. 1A and 1B are diagrams of applications in which embodiments of the present invention may be employed

FIG. 1A is a schematic drawing of free-space optical communications between an aircraft 2 and a communications center 24 using a transmitter 10 that is an embodiment of the present invention. The transmitter 10 emits plural beams 12, 14, 16, 18 at different wavelengths λ1-4 to a multi-aperture receiver 20. As illustrated in FIG. 1A, beams 12 and 18 experience fading due to atmospheric turbulence across a propagation distance 4, so the receiver 20 only detects beams 14 and 16. Channels 32, 34, 36, and 38 carry the detected signals from the receiver 20 via a transmission line 22 to the communications center 24. Because fading degrades the transmission, beams 14 and 16 transmit two copies of the same data, which are transmitted along channels 34 and 36 with an extinction ratio 31 (the ratio between the "on" power and the "off" power). The aircraft 2 and the communications center 24 can also communicate via radio-frequency antennas 6 to coordinate data transmission.

Figure 1B:
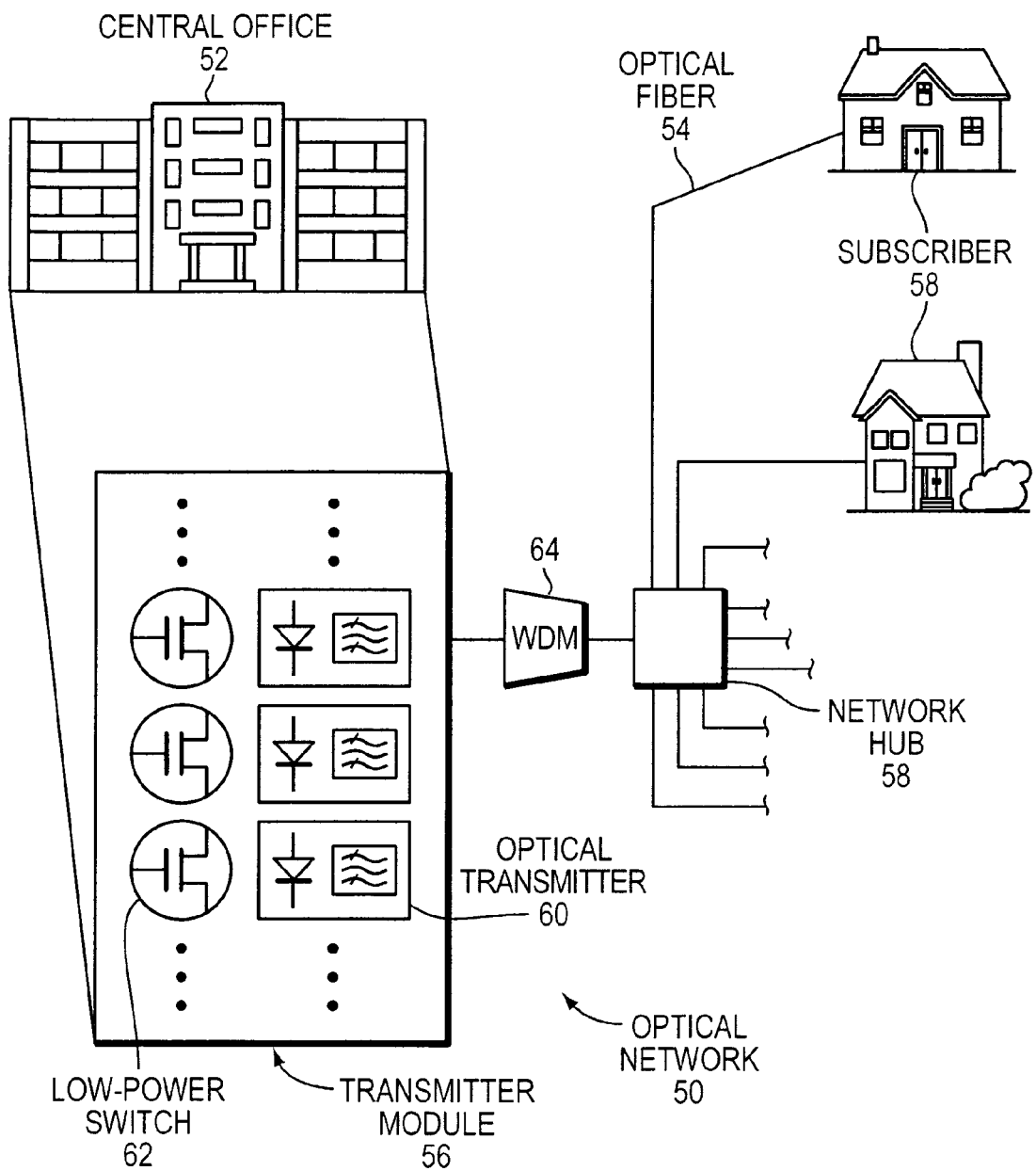

FIG. 1B is a schematic drawing of an optical network 50 that uses low-power switches 62 and optical transmitters 62 that form example embodiments of the present invention. A transmission module 56, which includes the low-power switches 62 and the optical transmitters 62, transmits information through a wavelength-division multiplexer (WDM) 64 from a central office 52 to subscribers 58 via optical fiber 54 network hubs 58. The network hubs 58 may include routers, switches, add/drop modules, amplifiers, and other suitable devices.

Figure 1C:
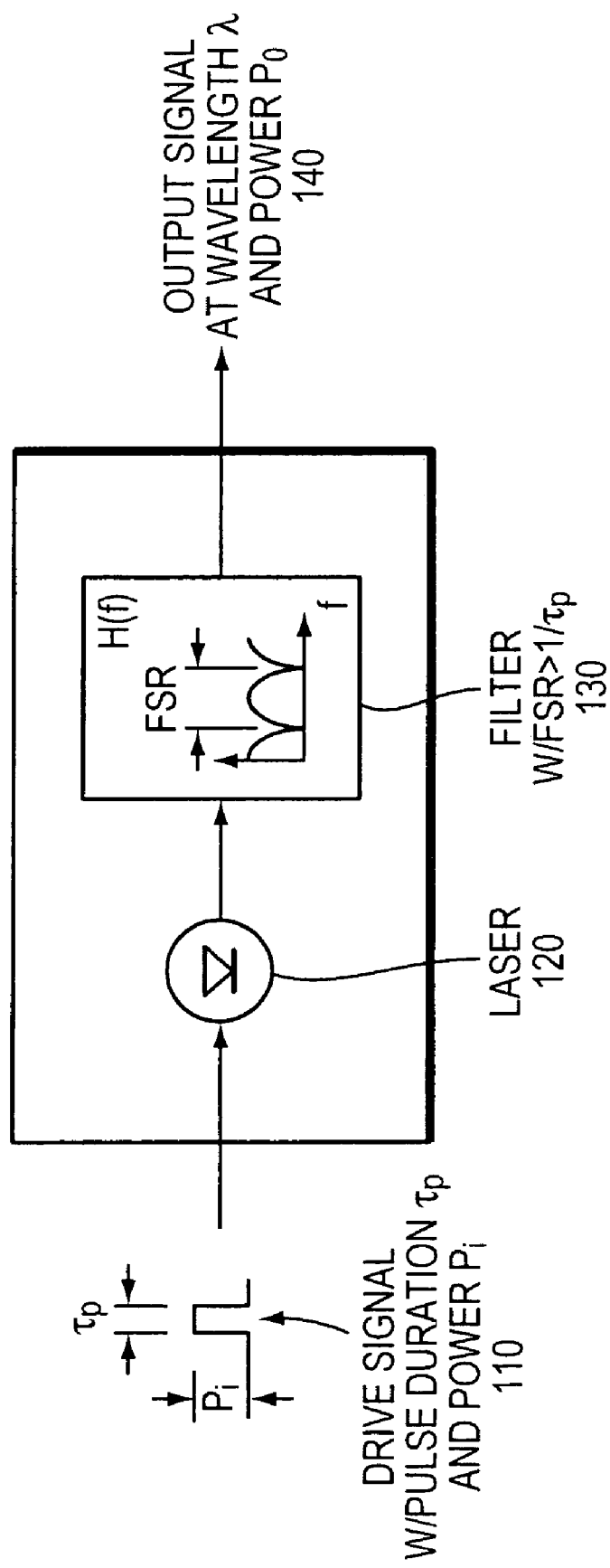
FIG. 1C is a schematic diagram that illustrates an embodiment of the present invention.

FIG. 1C is a schematic drawing showing an embodiment 100 consisting of a drive signal 110 characterized by a pulse with $\tau_p$ and a power $P_i$, which drives a laser 110. An optional bias signal (not shown) may also be applied to the laser 110. The laser 110 emits a signal that propagates through a filter 130 with a transfer function H(f), where f is the frequency of the optical carrier related to wavelength (λ) through the relation: f=c/λ. The filter 130, which is characterized by a free spectral range (FSR), where $FSR > 1/\tau_p$, passes an output signal 140 at a wavelength λ and a power $P_o$.

FIG. 2 is a schematic diagram that shows the influence that direct-current modulation has on both the power and frequency or wavelength of the optical output signal, resulting in both amplitude modulation (AM) of the power (top) and frequency modulation (FM) of the optical carrier (bottom). The AM modulation yields an unfiltered ER=Pbase/Pcrest. For low power applications (e.g., Δiac<~20 mA, ibias<~100 mA) the ER may range from ~1 dB to as much as ~7 dB depending on the bias current ibias, the magnitude of the drive waveform Δiac, and desired peak or average output power. An optical filter with transfer function H(f) may be aligned to pass the directed signal wavelength and reject the unwanted wavelength. Note that wavelength and frequency may be interchanged using the substitution f=c/λ, and differential relation $\Delta\lambda_{ac} = -(c/f^2)\Delta f_{ac}$, and the ac subscript refers to the fast changes since the laser carrier frequency deviation as a function of drive current is time dependent, e.g., f=f(t).

FIG. 3 is a set of graphs showing simulated output power (top) and ER (bottom) versus bias current for a laser with 0.1 nW/mA slope efficiency, a 20 mA threshold current, and a drive current Δiac=20 mA. In the top graph in FIG. 3, the solid line indicates unmodulated average power, the dashed line indicates modulated power Pcrest, and the dotted line indicates Pbase. In the bottom graph in FIG. 3, the extinction ratio is defined as ER=Pbase/Pcrest. For stable high-speed output, the lower level ibase of the time-varying current drive signal isig(t) should be above threshold with sufficient margin to prevent transient noise or ringing on isig(t) from causing the base to drop near or below the threshold. Note that the unfiltered ER is better at low bias currents, which coincides with reduced bias power requirements—and correspondingly lower average output power, which, when modulated, is further reduced by the modulation duty cycle. For master oscillator power amplifier (MOPA) TXs (described in greater detail below) in which the modulated waveform is followed by subsequent optical amplifier. this is a desirable region to operate, since ER is improved, bias power is reduced, and at 1.55 microns, optical amplifier power efficiency may be comparable or better than typical laser sources.

FIG. 4 is a time-frequency spectrogram 400 showing both time and frequency changes in a directly-driven laser in response to a short current pulse. Time and frequency resolution are approximately 100 psec and 5 GHz, respectively. The response to a 1 nsec ~75 mA current pulse, starting at time=0, increases output power by 2.4 times and shifts the laser center frequency by 20 GHz. This corresponds to an ER 410 of about 4 dB. In embodiments of the present invention, centering a narrow-band optical filter with a broad transmission peak at −20 GHz with a steep transition to an extended null centered near 0 GHz may improve the ER 420 to >20 dB.

FIG. 5 is a power vs. frequency diagram 500 illustrating a relationship of drive signals 510, 512 to a filter transfer function 520 corresponding to a double-pass or cascaded delay-line interferometer (DI). The filter transfer function 520 has a period commonly referred to as the free-spectral range (FSR). The separation between the transmission peak and null is FSR/2, which corresponds to the nominal switching frequency shift (Fπ). Note that for the purposes of this application, for non-periodic filters, e.g., a single filter passband surrounded by rejection bands, FSR/2 may be defined as the distance from transmission peak to null, where null may be defined as the point at which the transmission is substantially less than the desired ER.

The filter transfer function 520 has wide, relatively flat transmission peaks and broad and deep transmission nulls with 0.2 dB pass bandwidth and 30 dB rejection bandwidth both equal to ~0.1 FSR or equivalently, ~0.2 Fπ. A laser directly driven by a noisy drive current waveform (e.g., drive signal 510, which has 20% amplitude fluctuation) generates an AM waveform with ER=~4 dB (as in FIG. 4, described above) and FM waveform with shift ΔF1=Fπ±0.2 Fπ (aligned to the peak and null of the filter as shown above). The noise is effectively suppressed, and a high-fidelity output waveform is generated with ~34 dB ER and less than 0.2 dB ripple. Note that the 20 dB rejection bandwidth is 0.2 FSR=0.4 Fπ, almost twice as wide the 30 dB bandwidth (see FIG. 8, described in greater detail below).

For an application where only 20 dB ER is desired, this extra margin may be used to increase tolerances or, as shown for drive signal #2 512, reduce the drive amplitude to ΔF2=0.9*(Fπ±20%) and accommodate the 0.1 Fπ deviation from the optimum bias point while maintaining the desired 20 dB rejection. This example reduces bias tolerances needed for good ER, the frequency shift required by 10%, and the minimum switching power by about 20%.

Figure 6:
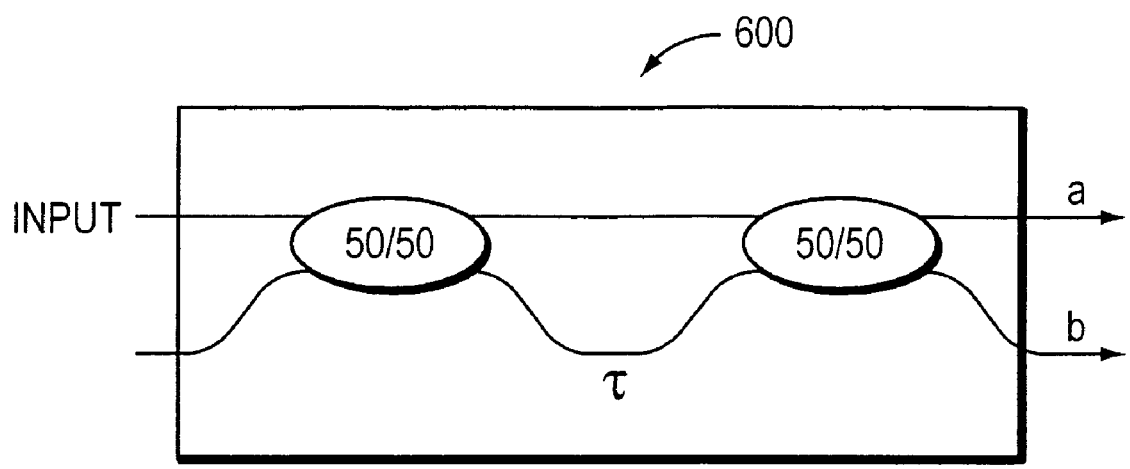
FIG. 6 is a schematic diagram that illustrates an embodiment of an optical delay line interferometer that may be employed as a filter in an optical transmitter in an embodiment of the present invention.

FIG. 6 is a schematic diagram of an example DI 600 using a Mach-Zehnder interferometer geometry, with delay τ and FSR=1/τ, that may be employed as a filter in a transmitter according to an embodiment of the invention. Alternatively, DIs may be constructed with various geometries, such as Michelson, Mach-Zehender and Sagnac geometries, and may be implemented with a variety of technologies, such as fiber, silica-on-silicon, semiconductor, free-space (micro-optic) and others with the same or different transfer functions.

Figure 7:
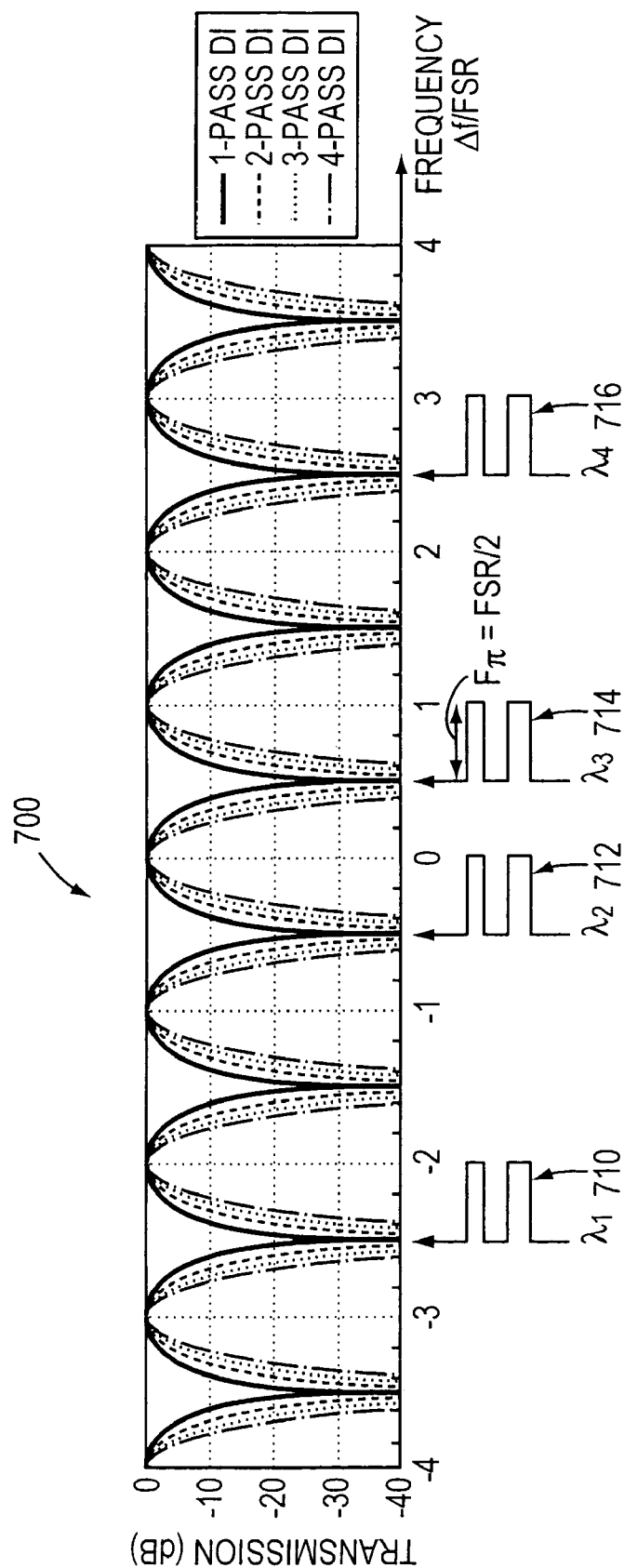
FIG. 7 is a graph that illustrates plural lasers wavelength aligned to different fringes (pass and reject bands) of N-pass optical delay line interferometers (N=1 to 4).

FIG. 7 is a graph 700 of transfer functions for N-pass DIs, which may be used to filter one or more direct-drive optical signals 710, 712, 714, 716. The spacing of the optical signals 710, 712, 714, 716 may be arbitrary, subject to constraints that good ER requires that the base of each waveform be aligned near a transmission null and good drive-signal noise suppress occurs in cases the crest of each waveform is aligned to a the relatively flat transmission peak of the optical filter, as shown.

Figure 8:
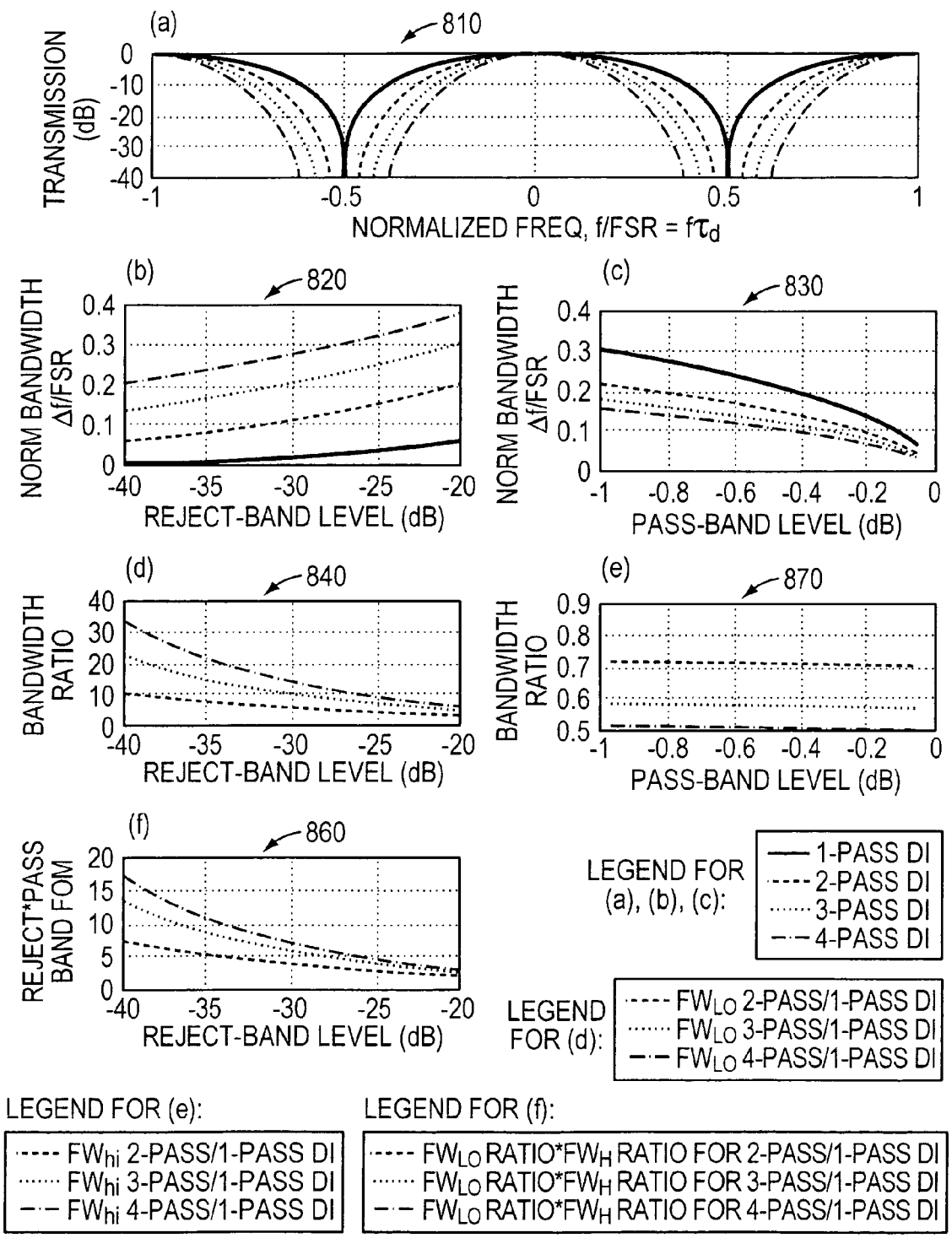
FIG. 8 is a set of graphs that illustrate a relationship between frequency response, pass bandwidth, and rejection bandwidth as a function of a number of passes for an optical delay line interferometer used as an optical filter in an embodiment of the present invention.

FIG. 8 is a set of graphs 810, 820, 830, 840, 850, 860, 870 that illustrate the relationship between a filter transfer function and various figures-of-merit (FOMs). Graph 810 shows multi-pass DI transfer functions, shown for the even port transmission given by H(f)=cos ^2N(πΔf/FSR), where N is the number of passes, equivalent to the number of cascaded DIs with the same alignment and FSR. Graph 820 shows a normalized reject bandwidth of the filter transmission at the notch (transmission null), and graph 830 shows a bandwidth of pass band centered on the transmission peak as a function of the transmission level. Graph 840 shows a reject-bandwidth ratio of the multi-pass relative to the single-pass, and graph 850 shows pass-bandwidth ratio of the multi-pass to single-pass DI as a function of transmission level. Graph 860 shows a figure-of-merit determined by the product of reject-band expansion and pass-band contraction, equal to the product of curves in graphs 840 and 850 respective to a particular N-pass filter. An FOM>>1 is desirable from an ER and noise suppression standpoint. Thus, as the desired ER gets larger (e.g., ER=25, 30, 35 dB and beyond), the FOM suggests an increasing benefit for using the higher number N-pass filters.

Figure 9:
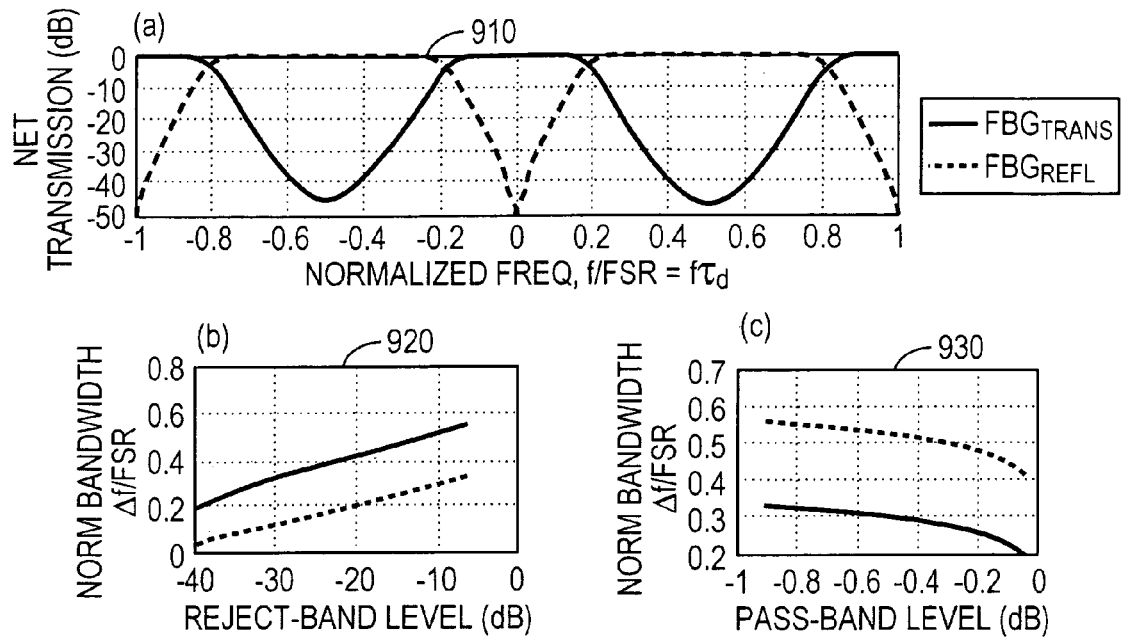
FIG. 9 is a set of graphs that illustrate the frequency response of fiber Bragg gratings (FBGs) used as filter in transmission and reflection geometries.

FIG. 9 is a set of graphs 910, 920, 930 that illustrate performance aspects of fiber Bragg grating (FBG) filter used in transmission and reflection. Graph 910 shows a simulation for a custom FBG filter transmission and reflection transfer functions. Graph 920 shows a normalized reject bandwidth of the filter transmission at the notch (transmission null), and graph 930 shows a pass bandwidth centered on the transmission peak as a function of the transmission level.

Figure 10:
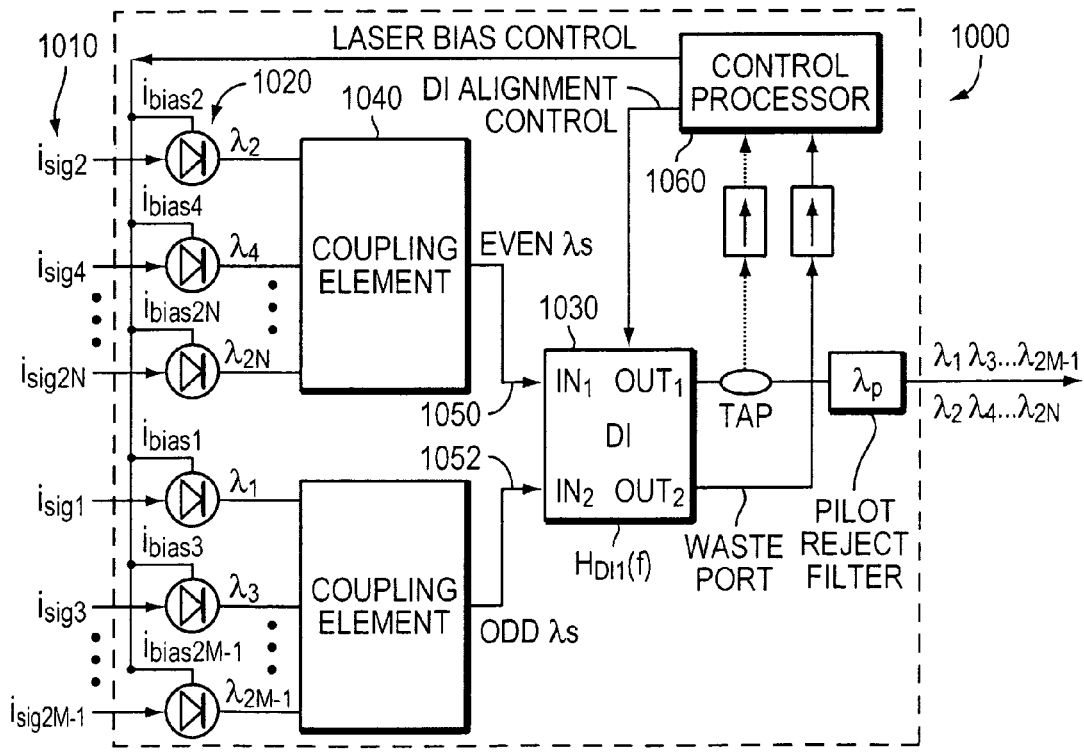
FIG. 10 is a schematic diagram that shows an example embodiment including plural lasers, an optical delay line interferometer, and a control processor controlling the spectral alignment of the lasers and the interferometer.

FIG. 10 is a schematic diagram of an example embodiment 1000 of the present invention. A single-pass DI 1030 filters output signals (not shown) from plural direct-drive laser sources 1020. Coupling elements 1040, which may be optical couplers, polarization combiners, interleavers, and/or WDM combiners, or any other suitable coupling element, direct even and odd input signals 1050, 1052 to DI input ports In1 and In2. A WDM combiner (not shown) may be used to multiplex and pre-filtering the input signals 1050, 1052 in a way that may or may contribute to the filter transfer function.

A pilot wavelength (not shown) may be injected at one of the signal inputs 1010 (or in the reverse direction by injection through one of the outputs so that the pilot may be separated from the signal(s) via direction), used as a probe signal to provide feedback to a control processor 1060 that may be used for DI wavelength alignment using techniques described in U.S. Pat. No. 7,233,430 and U.S. patent application Ser. No. 11/318,255. In this case, pilot reject filter(s) may be used to remove the pilot wavelength from the output. Alternatively, dither-based techniques may be used to optimize filter-to-transmitter wavelength alignment.

Note that input signals may be injected into the DI 1030 through either an odd or even numbered port of the DI 1030, where the odd transmission comb and even transmission comb are separated by FSR/2, providing a larger selection of input wavelength options. In this case, both odd and even channel wavelengths have maximum transmission through the DI 1030 at the same output port (e.g., Out1) so that the DI 1030 may perform the function of both filter and combiner, with both odd and even rejected components directed towards the waste port (e.g., Out2).

Figure 11:
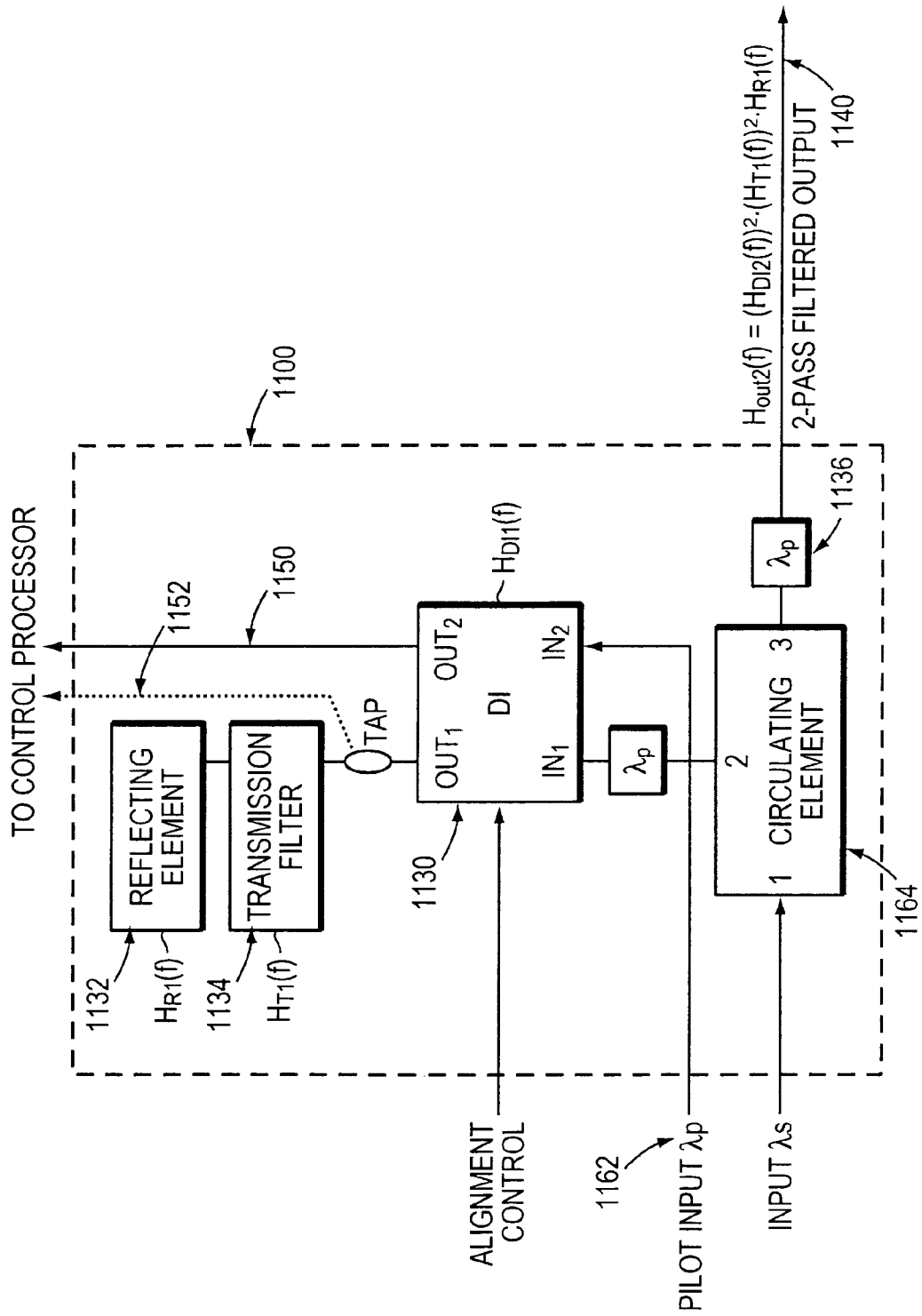
FIG. 11 is a schematic diagram that shows an example embodiment including a double-pass optical delay line interferometer and a pilot tone.

FIG. 11 shows an embodiment 1100 of the present invention including an example double-pass DI 1130, which includes a reflecting element 1132 and a transmission filter 1134. The double-pass DI 1130 has a transfer function Hout2 (f)=HDI2(f)·HT1(f)2·HR1(f), where HDI2(f)=cos 4(πf−fo)/FSR) is the transfer function for the passing the DI 1130 twice, fo is a frequency dependent on the DI bias, HT1(f)2 is the transfer function for the passing the transmission filter 1134 twice, and HR1(f) is the transfer function for the reflecting element 1132.

As with the single-pass DI (1030, FIG. 10), an optional pilot wavelength 1162 may be injected at one of the signal inputs # as a probe signal to provide feedback to a control processor (not shown). In this case, pilot reject filter(s) may be incorporated in the reflecting element 1132, transmission filter 1134, or included as separate filtering elements in one or more locations (e.g., as filter 1136 at the output) to remove the pilot wavelength 1162 from output signal 1140. Dither techniques may also be used to align input wavelengths to the filter to optimize both transmission and ER. For example, a small dither may be applied to the drive signal or bias current of the $i^{th}$ laser with output wavelength $\pi_i$. Adjusting the bias current $i_{bias-i}$ to optimize the second harmonic on the DI waste port (Out$_2$) 1150 aligns laser$_i$ for optimum extinction by optimizing DI throughput to the waste port during the off state. Similarly, adjusting the bias current or signal drive amplitude to optimize the second harmonic on the DI tap port (from Out$_1$) 1152 optimizes DI throughput during the on-state. By iteratively adjusting the bias current to maximize one of the second harmonic signals (e.g. from the waste port) and drive amplitude of signal current $i_{sig-1}$ to maximize the other second harmonic signal (e.g. from tap port), waveform ER and throughput may both be optimized such that the second harmonics are maximized (and first harmonic minimized) at both the tap and waste ports.

In combination, the double-pass DI 1130, reflecting element 1132, transmission filter 1134, and filters 1136 act as a net filter.

The reflecting element 1132 may include a Faraday rotating element, which, in combination with the double-pass through transmission filter 1134, enables the net filter to be polarization maintaining (PM) as long as circulating element 1164 is also PM, e.g., a PM coupler, circulator, or polarization beam splitter (PBS). Using a PM-PBS as the circulating element 1164 enables the net filter to be both PM and polarizing.

Figure 12:
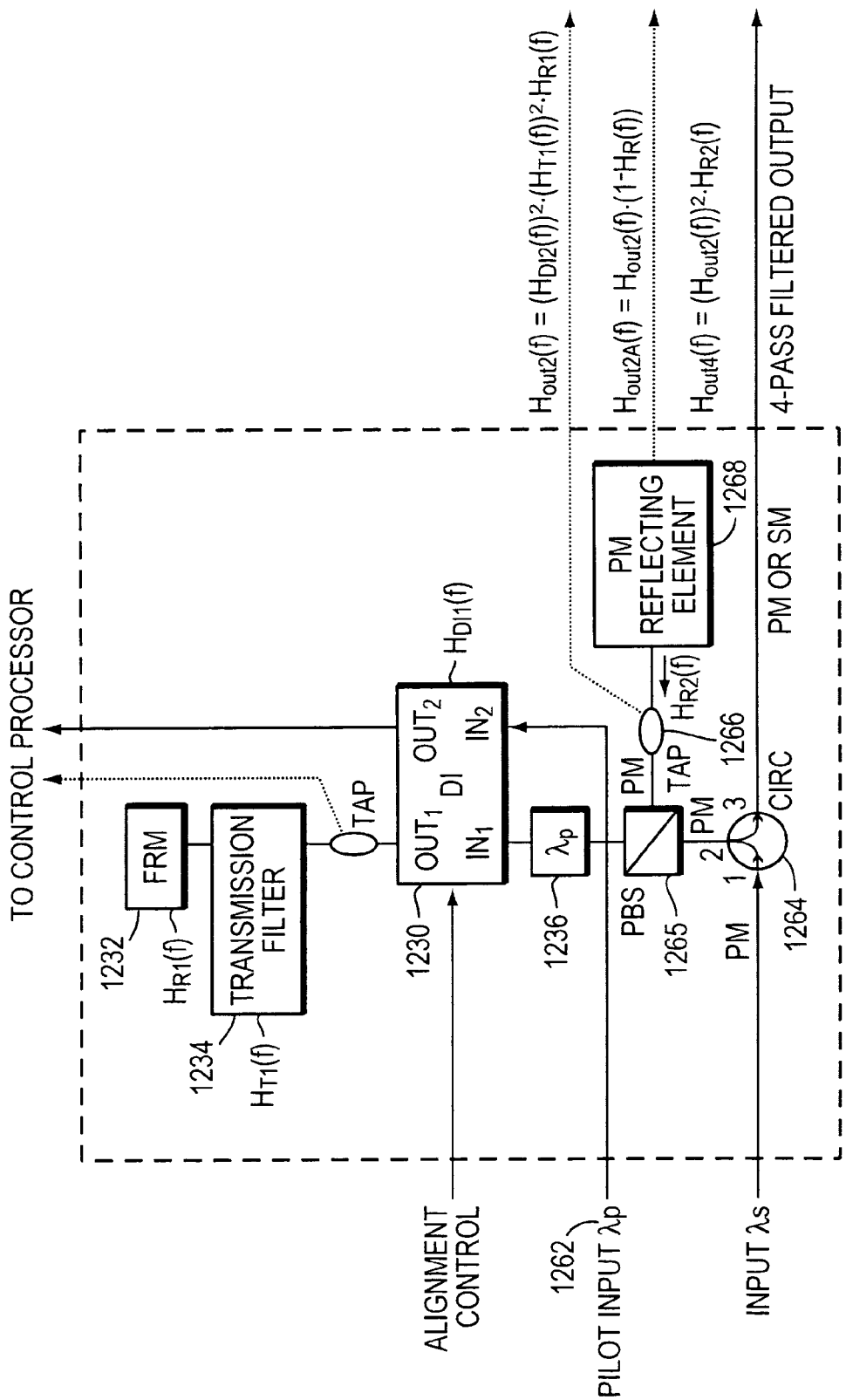
FIG. 12 is a schematic diagram that shows an example embodiment including a quadruple-pass optical delay line interferometer and a pilot tone.

FIG. 12 is a schematic diagram that illustrates a quadruple-pass DI 1230 used to filter one or more direct-drive laser sources. The quadruple-pass DI 1230 also provide 2-pass output Hout2($f$) from a tap 1266 inserted before PM reflecting element 1268. The PM reflecting element 1268 may be a broadband high-reflector or a periodic reflector with reflective transfer function HR2($f$) and transmissive transfer function HT2($f$)=1−HR2($f$). Such a filter can include a filter, such as a reflective FP, FBG, VBG, or diffraction grating filter.

Optionally, a transmission filter 1234 may have filtering characteristics that enhance the overall performance of the 4-pass DI. In this case, the transmission filter 1234 is passed four times as well, enabling a relatively weak filtering function to be strengthened considerably. The example embodiment shown in FIG. 12 also includes a Faraday rotator mirror 1234, PBS 1265, circulator or circulating coupler 1264. PM indicates PM connections are required, whereas unlabeled connections and connections labeled SM indicates PM connections are not required.

Figure 13:
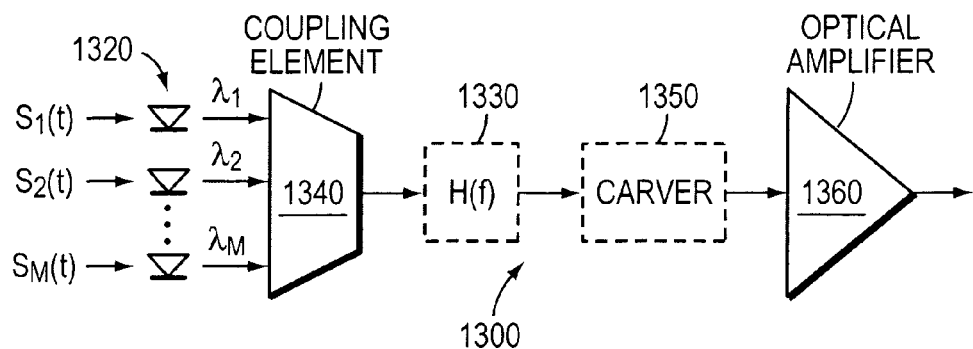
FIG. 13 is a schematic diagram that shows an example embodiment including plural lasers, a filter, and a carver.

FIG. 13 is a schematic diagram showing an embodiment of a multi-channel direct-drive transmitter 1300 in which M laser sources 1320 are combined through a coupling element 1340, which may include optical splitters or a WDM combiner. As described above, coupling elements 1340 including WDM combiners (e.g., AWGs) may act as both an efficient multiplexers and pre-filtering elements. A subsequent filter 1330 performs additional filtering. In preferred embodiments, the subsequent filter 1330 has a periodic transfer function and emits spectrally filtered output signals.

The spectrally filtered output signals (1 through M; not shown) may also be shaped in time via a carver 1350. To conserve power, the carver 1350 may be implemented with a resonant design (T. Sakamoto, T. Kawanishi, S. Shinada, and M. Izutsu, "Optoelectronic oscillator using LiNbO$_3$ intensity modulator with resonant electrode," *Electronic Letters*, vol. 41, 2005; R. Krähenbühl, J. H. Cole, R. P. Moeller, and M. M. Howerton, "High-Speed Optical Modulator in LiNbO$_3$ With Cascaded Resonant-Type Electrodes," *J. Lightwave Tech.*, vol. 24, pp. 2184-2189, May 2006). The spectrally and optionally temporally shaped signals may then be amplified by an optical amplifier 1360, which boosts the optical signals to a desired level, typically ranging from a few mW to ~20 W average power with commercially available amplifier technologies.

The carver 1350 may significantly improve ER, as described in greater detail below and shown in FIGS. 17-20, by temporally windowing transient filter seepage which occurs over a duration approximately N/FSR, where N is the number of filter passes. For large $\kappa = T_p/\tau_d$, (where $\tau_d = 1/\text{FSR}$) this duration is a relatively small portion of the pulse duration ($T_p$) and, therefore, does not degrade the ER significantly. By removing the transient filter seepage, the carver 1350 enables the ER to reach the steady-state filter limitation at much smaller values of $\kappa$, e.g., $\kappa = \sim 10$. Note that the independent lasers may be configured to have different polarizations, enabling polarization to be a modulated using this approach.

The embodiment 1300 shown in the FIG. 13 configuration is often referred to as a Master Oscillator Power Amplifier (MOPA) transmitter. Note that optical amplifier 1360 may be formed of multiple stages of gain with mid-stage filtering. Such mid-stage filtering may also incorporate periodic filtering elements that constructively add to the net filter transfer function that performs the spectral filtering. The amplifier 1360 may also be average-power-limited, e.g., a saturated EDFA or YDFA, in which the peak-output power varies inversely with the aggregate duty cycle (DC, where DC≦1). In this case, for low-duty-cycle signaling waveforms, an ER>15 dB−10 log$_{10}$(DC) is useful in order to maximize net TX efficiency. The cost-effectiveness of this approach improves with the number of WDM laser sources, since a filter 1330 and carver 1350 generally improve the waveform fidelity and ER for sources.

Figure 14:
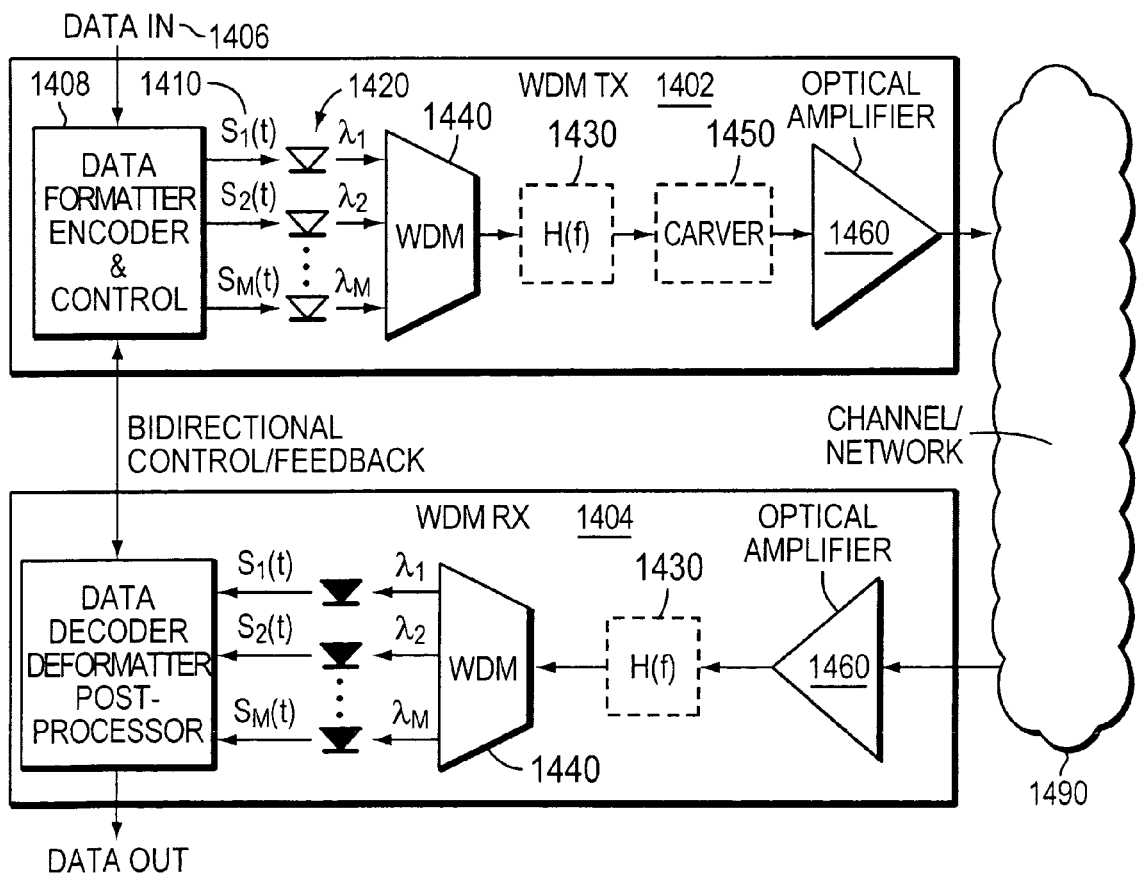
FIG. 14 is a schematic diagram that shows an example optical network including an embodiment of the present invention comprising plural lasers, a filter, and a carver transmitting through a variable channel.

FIG. 14 is a schematic diagram of an example optical link 1400 that incorporates a multi-channel direct-drive TX 1402, such as that shown in FIG. 3, and a WDM RX 1404. An input data stream 1406 is processed by a Data Formatter Encoder 1408 based on user or network-based control. Such control may be used to reconfigure TX 1402 and RX 1404 dynamically to adjust to the time-varying characteristics of the channel and/or user requirements. Such adjustments may include the number of WDM (independent) channels, the modulation format (e.g., OOK, M-DPSK, M-PPM, M-FSK, and hybrids, (e.g., M-orthogonal), as well as M-DPSK, (U.S. Provisional Application No. 60/927,713 filed on 4 May 2007)), duty cycle (U.S. Pat. No. 6,694,104), and Forward Error Correction (FEC) coding type and overhead.

For example, in a fading channel, diversity techniques may be used to reduce the depth of fades (K. Wilson, "Planned Operations for the JPL Optical Communications Telescope Laboratory (OCTL)," in International Symposium on Light Propagation and Sensing Technologies for Future Applications, Tokyo, 2002. X. Zhu and J. Kahn, "Free-space optical communication through atmospheric turbulence channels," IEEE Trans. Comm., vol. 50, August 2002. E. J. Shin and V. W. S. Chan, "Optical communication over the turbulent atmospheric channel using spatial diversity," in IEEE GLOBECOM, Taipei, Taiwan, R.O.C., 2002, pp. 2055-2060. V. W. S. Chan, "Free-space optical communications," J. Lightwave Tech., vol. 24, pp. 4750-4762, December 2006) and the Data Formatter Encoder 1408 may distribute redundant data over multiple TX wavelengths to mitigate the fading channel and optimize net data throughput. As channel characteristics improve, the amount of redundancy and transmitted photons/bit (diversity, coding overhead, duty-cycle) may be adjusted in order to increase the aggregate throughput. Communication between TX 1402 and RX 1404, either through a back channel or through a Channel/Network 1490, may be used to synchronize the TXs 1402 and RXs 1404, so that the type of data, e.g., the diversity, forward-error-correction coding type and overhead, modulation format, etc. on both ends of the optical link 1400 may be known and processed appropriately.

In the embodiment illustrated by FIG. 14, the TX 1402 includes of M-independent directly-driven laser sources that may be combined with a WDM 1440, filtered with a filter 1430, and pulse-shaped using an carver 1450. The filter 1430 is preferably periodic, and the combination of filtering due to the WDM 1440 and the filter 1430 constitute the net filtering that is seen by each channel in both the TX 1402 and RX 1404. An optical amplifier 1460 may be used to boost WDM TX signal(s) (not shown) 1410 to a desired level. While the WDM TX signal(s) may be driven independently, depending on the configuration, data signals $S_i(t)$ 1410 that are transmitted on wavelengths $\lambda_i$ (where i=1 to M) are dependent on the configuration of the Data Formatter Encoder 1408.

The WDM TX signal(s) are transmitted into the Channel or Network 1490. The RX 1404 receives the WDM TX signal(s) from the Channel/Network 1490. The received signals may be optically preamplified and subsequently filtered and WDM distributed to M photodetectors, which convey M electrical signals to the Data Decoder Deformatter and Postprocessor, where the data is appropriately interpreted based on the control and configuration of the RX 1404. Other types of RXs 1404, such as photon-counting, direct-detection, and coherent RXs, may also be used; however, these may incur a larger performance penalty than the preamplified RX due to the insertion loss of the WDM 1440. The output signaling waveforms from the TX 1402 (including the net filtering and optional pulse shaping) may be Gaussian-like, as described in U.S. Pat. No. 7,181,097, and approximately matched to the net filtering provided by the RX 1404.

Figure 15:
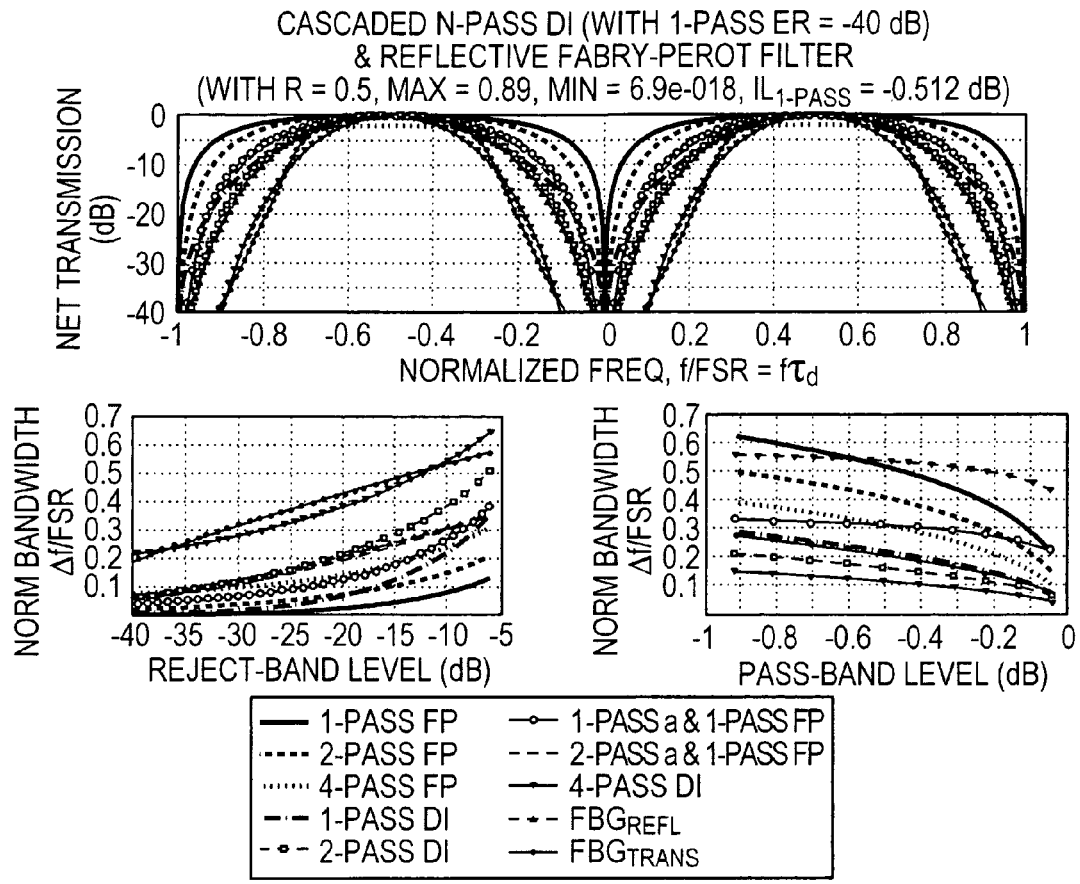
FIG. 15 is a set of graphs that illustrate frequency domain transfer functions of example filter embodiments that include a fiber Bragg grating filter, and plural passes through a delay-line interferometer, Fabry-Perot interferometer, and cascaded combinations.

FIG. 15 shows a set of graphs that depict filtering characteristics of N-pass DIs, N-pass reflective FPs, cascades of the two, and a custom FBG filter in transmission and reflection superimposed to illustrate the relative filtering characteristics—specifically the width of the pass and reject bands. Note that the multi-pass reflective FPs have a transfer function that corresponds to an $N^{th}$ order periodic Lorentzian, which may be implemented with FP filters or microring resonator filters in cascade or with multiple-order designs (Y. Yanagase, S. Suzuki, Y. Kokubun, and S. T. Chu, "Box-like filter response and expansion of FSR by a vertically triple coupled microring resonator filter," *J. Lightwave Technology*, vol. 20, pp. 1525-1529, August 2002; B. E. Little, et. al., "Very high-order microring resonator filters for WDM applications," *IEEE Photonics Tech. Lett*, vol. 16, pp. 2263-2265, October 2004).

Figure 16:
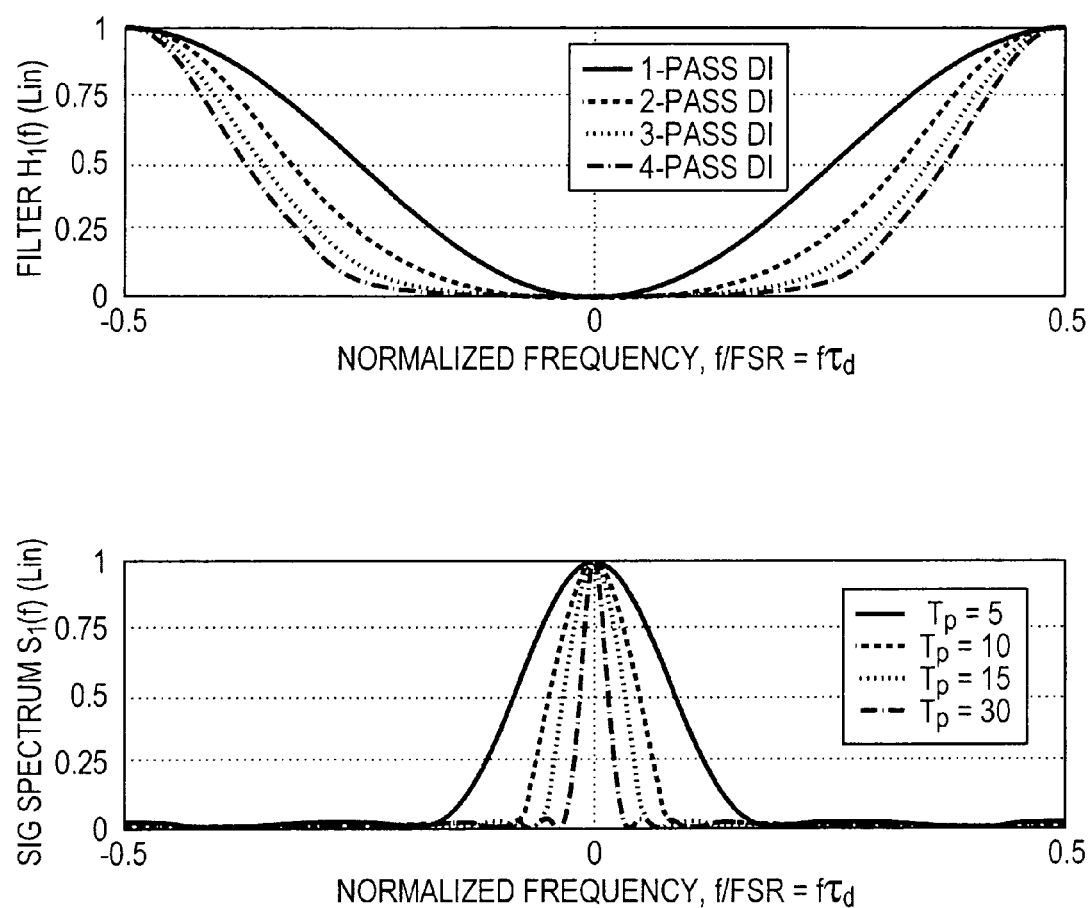
FIG. 16 is a set of graphs that illustrate (bottom).

FIG. 16 is a set of graphs that shows filter shape relative to non-return-to-zero (NRZ) waveform spectrum for varying pulse width Tp. As the pulse width increases, its spectral bandwidth, proportional to 1/Tp, decreases, causing more of the spectrum to fall in the reject portion of the filter, which is highlighted in the bottom chart for multi-pass DI filters. For a given pulse width, however, improved rejection bandwidth leads to better ER (determined by the product of the filter and waveform spectra), since the low-frequency content of the waveform, which contains a large percentage of the overall waveform energy, is rejected further (see FIGS. 17-20).

Figure 17:
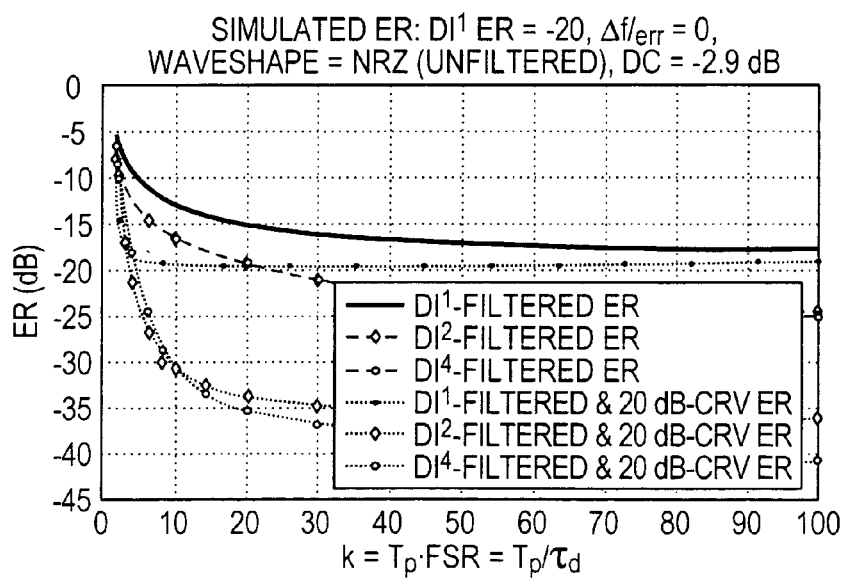
FIG. 17 is a graph that shows simulated extinction ratios as a function of filter type, pulsewidth·FSR product, with and without a pulse-carving modulator, with no frequency alignment error ($\Delta f_{err}=0$), and a −2.9 dB duty cycle. and example output signal.
Figure 18:
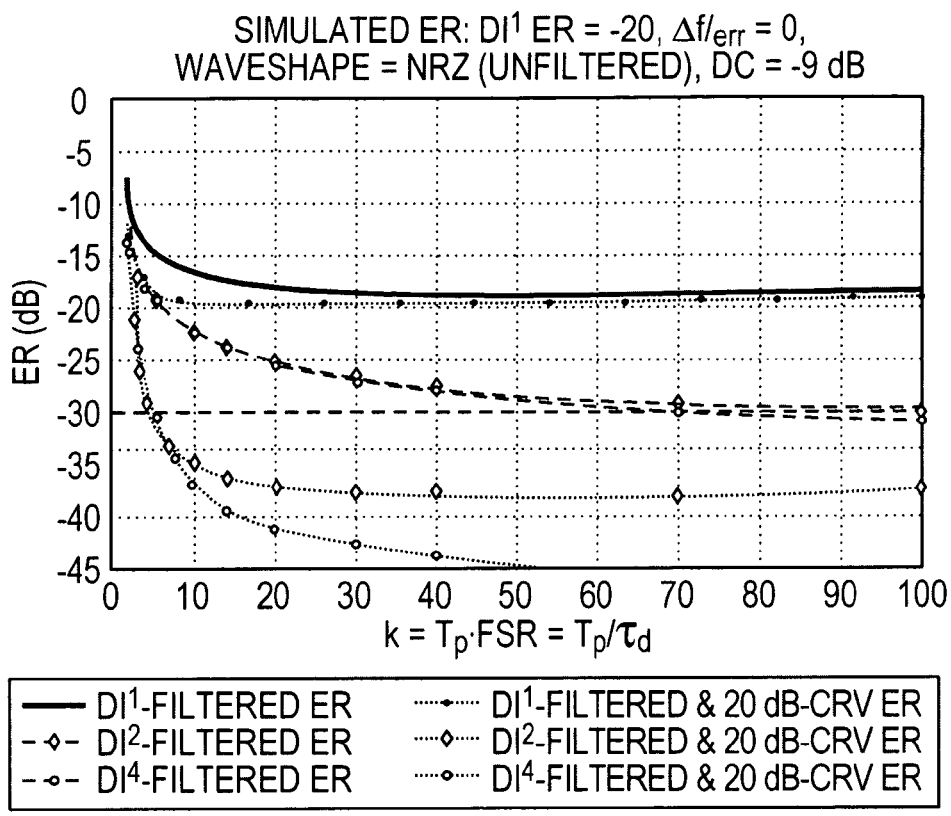
FIG. 18 is a graph that shows simulated extinction ratios as a function of filter type, pulsewidth·FSR product, with and without a pulse-carving modulator, with no frequency alignment error ($\Delta f_{err}=0$), and a −9 dB duty cycle. and example output signal.

FIGS. 17 and 18 show filtering transmission trends through N-pass DIs for 50% and 1:8 data duty cycles, respectively, and optimal filter alignment ($\Delta f_{err}=0$). For large $\kappa$, the ER approaches the limitation of the filter rejection, which is $-20N$ for the $DI^N$ filters in these simulations. The use of pulse carving (simulated here with only 20 dB ER) to clean up the filtered waveform output significantly reduces the K factor needed for the filter to converge towards the filter-limited ER. Note that this simulation does not include the additional ER due to residual AM illustrated in the bottom of FIG. 3, which improve ER performance by up to ~6 dB.

Figure 19:
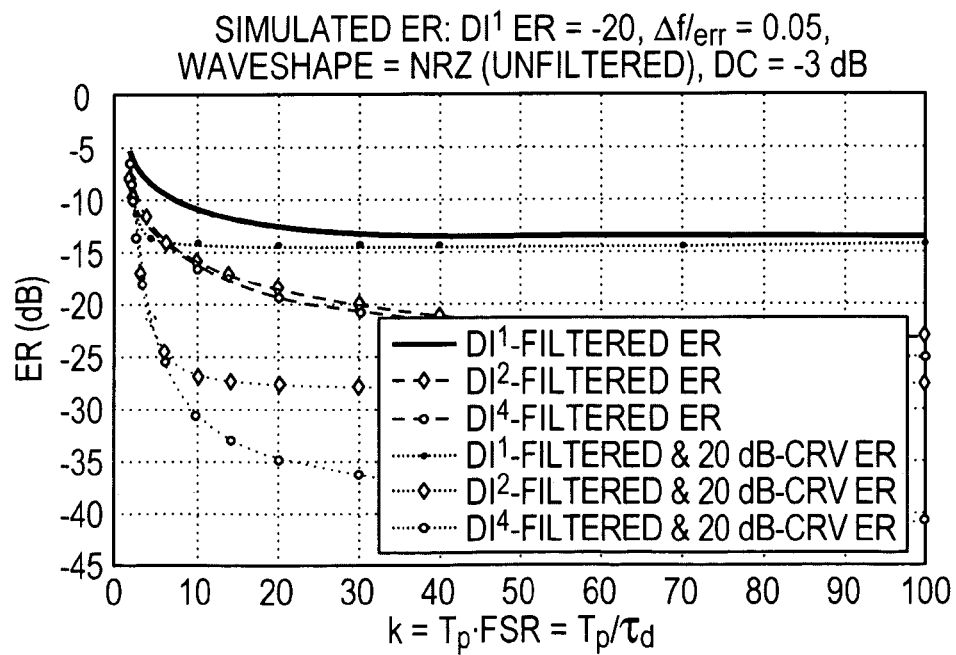
FIG. 19 is a graph that shows simulated extinction ratios as a function of filter type, pulsewidth·FSR product, with and without a pulse-carving modulator, with a frequency alignment error ($\Delta f_{err}=0.05$ FSR), and a −2.9 dB duty cycle. and example output signal.
Figure 20:
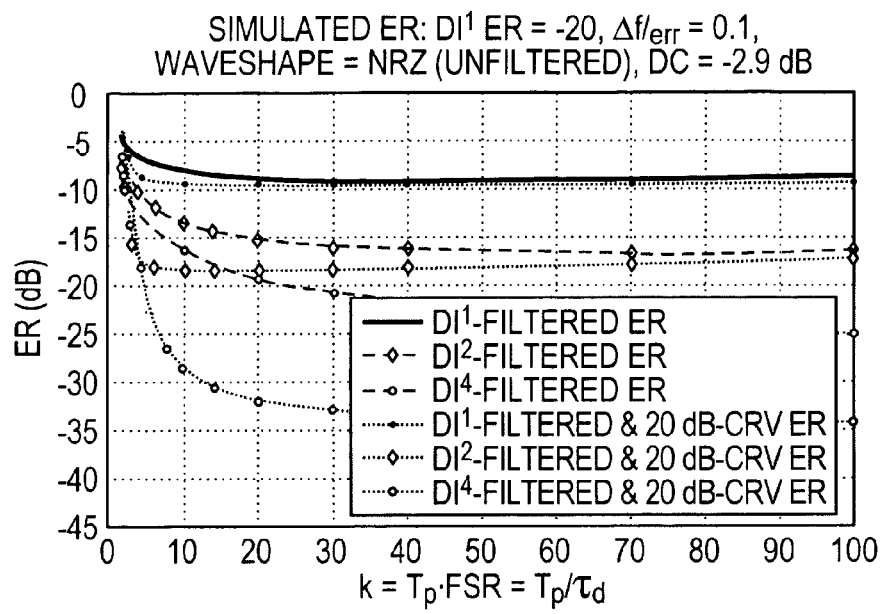
FIG. 20 is a graph that shows simulated extinction ratios as a function of filter type, pulsewidth·FSR product, with and without a pulse-carving modulator, with a frequency alignment error ($\Delta f_{err}=0.1$ FSR), and a −2.9 dB duty cycle. and example output signal.

FIGS. 19 and 20 are graphs showing filtering transmission trends through N-pass DIs for 50% data duty cycle and frequency offset errors of 0.05 FSR and 0.1 FSR, respectively. Such an error may be due to errors in biasing or noise/ringing on the input drive waveforms, and illustrates the two primary benefits of using the multi-pass filters with a larger rejection bandwidth, namely, they have better ER, and the ER is less sensitive to frequency-alignment offset errors.

For the frequency offset error of 0.05 FSR shown in FIG. 19, the DI1 filter provides<15 dB ER and the DI2 filter provides<30 dB ER (a 15 dB improvement over the DI1 filter), whereas the DI4 filter with the widest rejection band simulated here still provides>30 dB ER for $\kappa$>10. Note that this simulation does not include the additional ER due to residual AM illustrated in the bottom of FIG. 3, which improves ER performance by up to ~6 dB.

For the frequency offset error of 0.1 FSR shown in FIG. 20, the $DI^1$ filter provides<10 dB ER and the $DI^2$ filter provides<20 dB ER (but about 10 dB better than the $DI^1$ filter), whereas the $DI^4$ filter with the widest rejection band simulated here still provides>20 dB ER with relatively low values of $\kappa$, and ER>~30 dB ER for $\kappa$>~10, with only about a few dB degradation in ER relative to the optimally aligned case shown in FIG. 17. Note that this simulation does not include the additional ER due to residual AM illustrated in the bottom of FIG. 3, which improves ER performance by up to ~6 dB or more.

Figure 21:
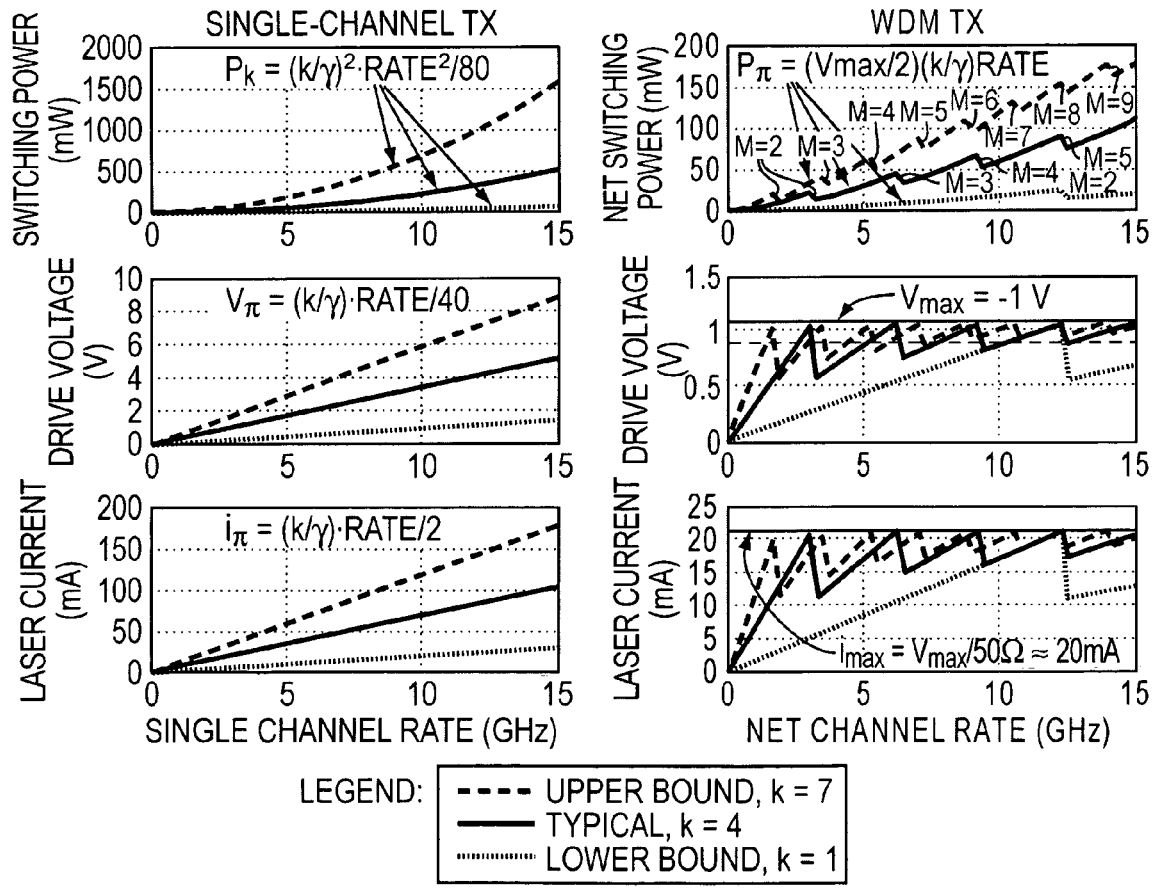
FIG. 21 is a set of graphs that illustrate the relationship among switching power, drive voltage, laser current, and channel rate for single-channel and wavelength division multiplexed (WDM) transmitter (TX) embodiments.

FIG. 21 is a set of graphs that show relationships between switching power, laser drive voltage, and laser current for a single filtered-direct-drive laser TX (left column) and an M-WDM filtered-direct-drive laser TXs (right column) where the fast component of the laser frequency change as a function of drive current change $\gamma=0.3$ GHz/mA, and net drive impedance=$50\Omega$. Each chart includes estimates for three nominal values of $\kappa$ (FSR/Rate): $\kappa=1$ (a lower bound, dotted-line); $\kappa=4$ (typical, solid-line); and $\kappa=7$ (upper bound, dashed-line).

For the right-hand WDM TX charts, the maximum drive voltage Vmax is limited to ~1V, which in practice may be a value associated with a maximum voltage level of a particular class of electronics or logic gates. As the net data rate requires a direct-drive voltage that exceeds this level (see Eq. (16) below), the number of WDM lasers (M) increases so that the net rate may be achieved within the given voltage constraints. As a result of the WDM distribution, the direct-drive power required for each of the M-WDM lasers is bounded by $(Vmax)^2/50\Omega=\sim 20$ mW, and is effectively reduced by a factor of $M^2$. The net power is reduced by about a factor of M relative to that of the single channel direct-drive TX shown in the left-hand charts. Note also that power the single-channel TX is proportional to the square of the Rate·($\kappa/\gamma$) product in contrast to the WDM TX, in which the power growth is linearly proportional to the Rate·($\kappa/\gamma$) product.

Figure 22:
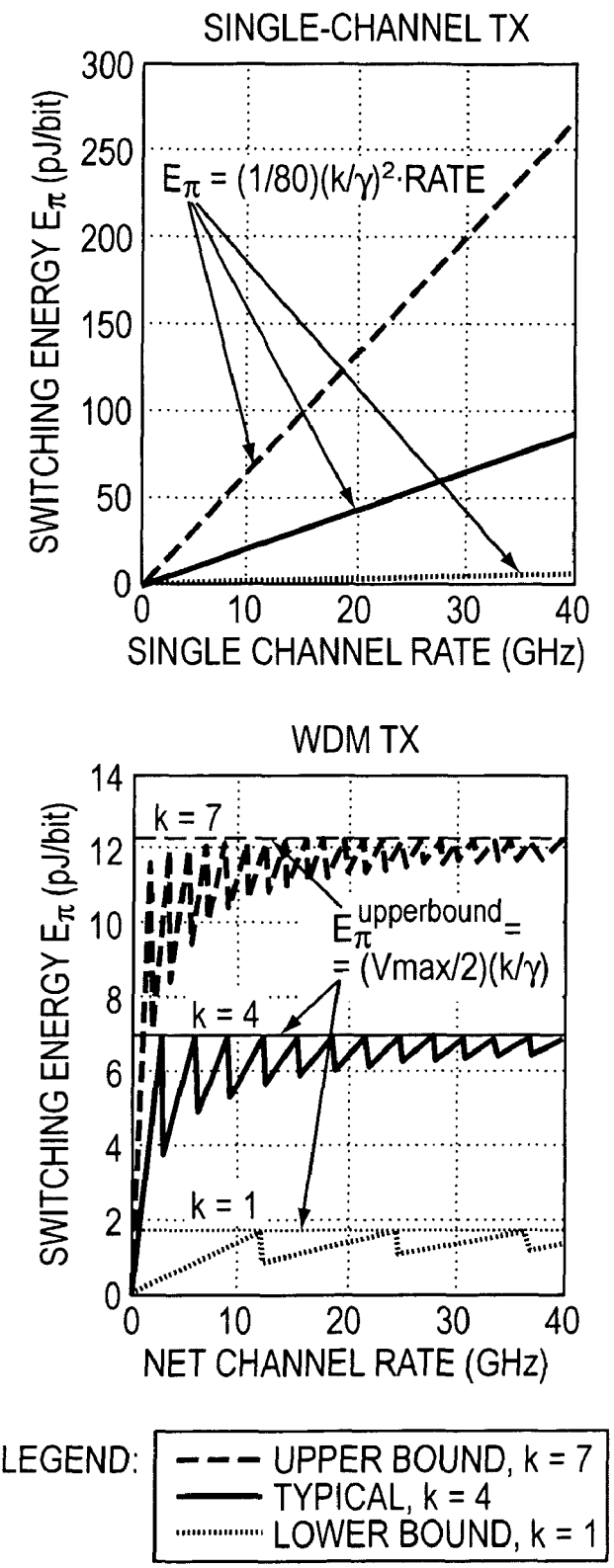
FIG. 22 is a set of graphs that illustrate the relationship between switching energy and channel rate for single-channel and wavelength division multiplexed (WDM) transmitter (TX). embodiments.

FIG. 22 is a graph that shows switching energy as a function of channel rate for a single filtered-direct-drive laser TX (left) and an M-WDM filtered-direct-drive laser TXs (right). The powers are the same as those for the curves shown in FIG. 21, where $\gamma=0.3$ GHz/mA, the net drive impedance=50%, and the maximum drive voltage Vmax=1.05 V. Note that the switching energy for the single-channel TX is proportional to the rate and has a slope proportional to the square of $\kappa/\gamma$ (see Eq. (18) below). In contrast, the switching energy for the M-WDM-TX independent of the data rate and bounded by a level that is proportional to $\kappa/\gamma$ (see Eq. (19) below).

4 Filtering

In some embodiments, the filter is periodic, so that it may be used to filter one or more lasers of different wavelengths. The filter period is often referred to as the free spectral range (FSR). In a preferred embodiment, the frequency distance between the transmission maxima (peaks) and transmission minima (nulls) is FSR/2 as shown in FIG. 5. Thus, to achieve maximum ER, the laser frequency needs to shift nominally by $\Delta f=FSR/2=F_\pi$, where $F_\pi$ is the frequency change between transmission minima and maxima.

As illustrated in FIG. 5, frequency noise is suppressed by the nonlinear shape of the filter. This frequency domain filtering property is similar to the noise suppression that occurs in conventional Mach-Zehnder modulators (MZMs), which have a $\cos^2(\frac{1}{2}\pi\Delta V/V_\pi)$ transfer function. Here, $V_\pi$ is the switching voltage (typically 3-6 V) and $\Delta V$ is the drive voltage, which may carry time-varying signal waveforms. With proper selection, the filter transfer function, H(f), achieves similar noise suppression with low switching power. (For example, consider a passive delay-line interferometer (DI) in which $H(f)=\cos^2(\pi\Delta f/FSR)=\cos^2(\frac{1}{2}\Delta f/F_\pi)$, as shown in FIG. 6.) However, unlike active MZMs, passive optical filters may be cascaded or multi-passed to improve both noise suppression and ER benefits without complicating the RF phase matching or increasing drive requirements. As shown in FIGS. 7 and 8, for example, a double-pass DI (DP-DI) has a transfer function $H_{DI2}(f)=\cos^4(\pi\Delta f/FSR)$.

The filter may be single polarization and/or polarization maintaining (PM), and may be used with single-polarization devices such as MZMs and polarization-dependent receivers. FIG. 11 shows an example embodiment of such a filter—specifically, a DP-DI—comprising a single DI, a reflecting element, and a circulating element, e.g., a polarization beam splitter (PBS) or a circulator. The reflecting element may be a gold-coated or dielectric mirror, fiber Bragg gratings (FBGs), Faraday rotating mirrors (FRMs), or any other suitable reflecting element. FRMs enable single-polarization or polarization maintaining capability, without necessitating PM DIs or couplers. Generally, DP DI filters provide>35 dB ER enhancement based on the performance of available commercial off the self (COTS) DIs with only ~20 dB ER. The DP-DIs periodic transmission nulls are deep but, more importantly, they are broad, simplifying the process of generating high ER waveforms by relaxing alignment tolerances. For example, while a good single-pass Mach-Zehnder interferometer (MZI) may provide 30 dB ER, its bandwidth at this rejection is limited to only ~2% of its FSR. In contrast, the 30 dB rejection bandwidths for a DP-MZI is about 5 times wider, about 10% of the FSR.

Additional benefits of using multi-pass DIs (instead of cascading independent DIs) include cost, since DIs are relatively expensive, and simplification of control, since wavelength alignment is only needed for a single DI. Other embodiments include a high-ER fiber Bragg grating (FBG) filter (see FIG. 9), which may be customized to provide>20 dB ER with periodic pass and reject bands. FBG filters can operate in reflection, in conjunction with a circulating element, or in transmission, providing low-cost all-fiber filtering solution for single and multiple laser sources.

Periodic reflectors may also be used as the reflecting element in the DP-DI to improve further the breadth and depth of the rejection bands and/or flatten the transmission bands. Other types of periodic reflectors, such as Fabry-Perot filters, microring resonator filters, or other filters with Lorentzian or 1-Lorentzian transfer functions, can be used as well (see improvements to transfer function for multi-pass DIs and FP cascaded filtering in FIG. 15). Optional coupling elements, such as wavelength multiplexers and couplers, may be used to direct one or more output signals into the even and odd input ports of the DI. Such embodiments may be used along with conventional filter-based direct-drive techniques, such as Chirp-Managed Lasers, which may be used to reduce the impact of dispersion in fiber-optic applications (Y. Matsui, D. Mahgerefteh, X. Zheng, C. Liao, Z. F. Fan, K. McCallion, and P. Tayebati, "Chirp-Managed Directly Modulated Laser (CML)," *Photonics Tech. Lett.*, vol. 18, pp. 385-386, January 2006; S. Chandrasekhar, C. R. Doerr, L. L. Buhl, Y. Matsui, D. Mahgerefteh, X. Zheng, K. McCallion, Z. Fan, and P. Tayebati, "Repeaterless Transmission With Negative Penalty Over 285 km at 10 Gb/s Using a Chirp Managed Laser," *Photonics Tech. Lett.*, vol. 17, pp. 2454-2457, November 2005; S. Chandrasekhar, A. H. Gnauck, G. Raybon, L. L. Buhl, D. Mahgerefteh, X. Zheng, Y. Matsui, K. McCallion, Z. Fan, and P. Tayebati, "Chirp-Managed Laser and MLSE-RX Enables Transmission Over 1200 km at 1550 nm in a DWDM Environment in NZDSF at 10 Gb/s Without Any Optical Dispersion Compensation" *Photonics Tech. Lett.*, vol. 18, pp. 1560-1562, July 2006). As noted above, an ER of 10 dB reduces the RX sensitivity by ~3 dB, which reduces the span between repeaters in fiber-optic links by a factor of two. Combining chirp management-optimized filtering with ER-optimized filtering provides up to a factor of two improvement in the CML-based results.

FIG. 8 shows a set of graphs that illustrate the transmission characteristics of multi-pass DIs. As the number of passes increases, the following trends are observed.

First, the rejection nulls get wider and deeper. A practical benefit of this is that relatively low-ER filters may be used in cascade or multi-pass geometries to improve the ER breadth and depth. Even if a noise floor limits the improvement in ER depths to, for example, 40 dB, the increase in the width of the rejection nulls still provides significant benefit from the standpoint of simplifying alignment, and reducing switching power and ER-sensitivity to noise on the drive signal or bias control as shown in FIG. 5.

Second, the pass bandwidths narrow. But, as seen in FIGS. 8(a) and (c), the pass bandwidths narrow at a much lower symbol rate than the reject bands widen. For example, the 35 dB rejection bandwidth increases by about 8 times, from ~1% to 8% for 1-pass and 2-pass DIs, respectively, whereas the pass bandwidth is reduced by a factor of ~0.7. Since the pass-band contraction is relatively constant, a figure-of-merit (FOM) for the reject-pass-band ratio improvement over the 1-pass case may be calculated by the product, in this case at 35 dB ER is 8*0.7=~5.4 for the 2-pass, and ~21 for the 4-pass. From the standpoint of ER and noise suppression, the increasing FOM shows the net benefit from increasing the number of passes. This FOM, however, does not include practical considerations, such as implementation complexity and net filter insertion loss. A relatively straightforward method of implementing a 4-pass DI transfer function with only a single DI is shown in FIG. 12.

5 Filter and Laser Alignment Considerations

In embodiments employing periodic filters, the periodicity of the filter simplifies the alignment of the lasers, since the lasers may be tuned to any transmission level within one period or FSR of the filter (see FIG. 7). For example, for an optical filter with an FSR=6.25 GHz ($\frac{1}{16}^{th}$ the standard 100 GHz spaced ITU grid), a typical DFB laser with (slow) wavelength tuning coefficients $$\frac{d\lambda}{dT} \approx 0.1 \frac{nm}{°C.} = -12.5 \frac{GHz}{°C.} \quad (1)$$

$$\frac{d\lambda}{di_{DC}} \approx 0.004 \frac{nm}{mA} = -0.5 \frac{GHz}{mA}. \quad (2)$$

is never more than a ±0.25° C. or ±6.25 mA (dc bias current) away from any part of the filter shape. With feedback, this provides the option to have TX laser(s) track the nearest target point(s) on the filter. For a multiple wavelength TX spaced at integer multiples of the FSR, the lasers maintain their relative spacing by tuning only a fraction of a degree around the ambient temperature, greatly reducing the net power required for temperature tuning. The filter may also be tuned by about −12.5 GHz/° C. to follow the ambient temperature induced shifts on the laser wavelength. This enables the lasers to remain in the vicinity of their respective target fringe with minimal change in bias power, as the lasers do not have to hop to other fringes.

The power savings results in a reduction in the net thermoelectric cooler (TEC) current required to maintain the proper laser temperature and wavelength. For independently packaged DFB lasers, this is about 12 mA/° C. per laser (U.S. Provisional Application No. 60/927,713). Assuming a 2 V source voltage, this corresponds to a power requirement of 24 mW/° C. per laser. For a ±H° C. swing in ambient temperature and M lasers, this would require up to 24·M·H mW of power for temperature control. If the filter temperature tuning cost is comparable to that of the laser, the net savings is 24(M)H mW. For H=±15° C. and M=16 lasers, this corresponds to 5.4 W, as only<~360 mW is needed to tune the filter, and <100 mW is required for fine temperature control of the 16 lasers. Note that when such a TX is used with receivers that incorporate tight filtering, this approach uses the same tuning of RX filter(s), so they may track in incoming TX wavelength(s), as described in U.S. Pat. No. 7,233,430.

In certain embodiments, precision alignment of the filter to a predetermined wavelength is achieved using pilot-tone based techniques to provide closed loop control as shown in FIG. 10 and in U.S. patent application Ser. Nos. 11/318,255 and 11/022,344. Pilot-tone based techniques may be combined with precalibration of the direct-drive laser sources to align the individual transmitters to the filter pass and reject bands. An alternative method of controlling the input signal wavelengths and filter wavelength alignment is to use dither techniques.

For example, applying a small dither to the drive signal or bias current $i_{bias-i}$ of the $i^{th}$ laser with output wavelength $\lambda_i$ optimizes the second harmonic on the DI waste port, aligning laser$_i$ for optimum extinction. Similarly, adjusting the bias current to optimize the second harmonic on the DI tap port optimizes DI throughput during the on-state. In addition, since the magnitude of the second harmonic is proportional to the transmitted power, the second harmonic may be used to adjust or balance filtered transmitter output powers.

Knowledge of the $i^{th}$ signals duty cycle combined with calibrated tap and waste port measurements may be used for diagnostics and to ensure proper signal polarity. Iteratively adjusting the bias current to maximize one of the second harmonic signals (e.g., from the waste port) and drive amplitude of signal current $i_{sig-i}$ to maximize the other second harmonic signal (e.g., from tap port) optimizes both the waveform ER and throughput such that the second harmonics are maximized (and first harmonic minimized) at both the tap and waste ports. Iterating through all the lasers one at a time, or using a distinct dither frequency for each laser, enables performing in-situ bias optimization on all the lasers as needed to maintain optimum waveform fidelity. Iterating through all the lasers has additional benefits in tightly spaced WDM applications, since it enables a large number of potentially independently controlled sources to be well aligned to a uniform frequency grid determined by the optical filtering element.

5 Power Considerations

The fast FM modulation coefficient, γ in (3), represents the linear change in laser frequency per mA of drive current at high speeds (e.g., >1 MHz).

$$\gamma = \frac{d\lambda}{di_{AC}} \approx -0.0024 \left[\frac{nm}{mA}\right]_{typical} = 0.3 \left[\frac{GHz}{mA}\right]_{at\ 1550nm}. \quad (3)$$

As noted above, the FM switching frequency $F_\pi$ for periodic filters may be defined as the frequency change required to go from a filter transmission peak to null or $$F_\pi = \frac{FSR}{2}\ [GHz]. \quad (4)$$

Therefore, the switching drive current, $i_\pi$, becomes $$i_\pi = \frac{F_\pi}{\gamma} = \frac{FSR}{2\gamma}\ [mA], \quad (5)$$

and the corresponding switching voltage, $V_\pi$, is $$V_\pi = i_\pi R_\Omega = \frac{FSR}{40\gamma}\ [V], \quad (6)$$

where $R_\Omega$ is the load resistance as seen by the laser driver (typically ~50Ω). In order to minimize filter-induced pulse broadening and achieve good modulation ER it is desirable increase the ratio $$\kappa = \frac{T_p}{\tau_{delay}} \geq \sim 1 \left[\frac{GHz}{Gbit/s}\right], \quad (7)$$

where $T_p$ is the pulse duration. FIGS. 16-20 show graphs of simulations that illustrate the relationships between modulation ER versus the FSR·$T_p$ product (κ) for various configurations including frequency offset errors, duty cycle, and filter shape. Note that for binary NRZ modulation, FSR·$T_p$=FSR·$\tau_{symbol}$=FSR/Rate.

Note that the relationship between the pulse duration $T_p$ (which is inversely proportional to the electrical bandwidth per channel), the symbol period ($\tau_{symbol}$), the data rate k/$\tau_{symbol}$ (where k is the number of bits/symbol) is dependent on the modulation format. For example for binary OOK, ·$T_p$=$\tau_{symbol}$=1/Rate. For M-WDM channels, this relationship remains the same on a per-channel basis, with the aggregate rate being M·Rate. However, for M-PPM, $T_p$=$\tau_{symbol}$/M=log 2(M)/(M·Rate), where k=log 2(M), and for M-FSK, ·$T_p$=$\tau_{symbol}$=log$_2$(M)/Rate. For such non-binary modulation formats, the term Rate used in this analysis may need to be adjusted accordingly.

However, in order to minimize switching power it may also be desirable to limit this ratio $$\frac{T_p}{\tau_{delay}} = \kappa \leq \sim 7, \quad (8)$$

since the switching power ($P_\pi$) is given by $$P_\pi = i_\pi V_\pi = \frac{FSR^2}{80\gamma^2} = \frac{FSR^2}{7.2}\ [mW], \quad (9)$$

where the right-hand-side of Eq. (9) was obtained by substituting the typical value γ=0.3 GHz/mA. Further substituting the constraints for good ER and low drive power consumption given in Eqs. (7) and (8) through the parameter κ the switching voltage, current, and power become $$i_\pi = \left(\frac{\kappa}{\gamma}\right)\frac{\text{Rate}}{2} = \frac{\kappa \text{Rate}}{0.6} \ [\text{mA}], \quad (10)$$

$$V_\pi = \left(\frac{\kappa}{\gamma}\right)\frac{\text{Rate}}{40} = \frac{\kappa \text{Rate}}{12} \ [\text{V}], \quad (11)$$

$$P_\pi = \left(\frac{\kappa}{\gamma}\right)^2 \frac{\text{Rate}^2}{80} = \frac{(\kappa \text{Rate})^2}{7.2} \ [\text{mW}], \quad (12)$$

where K may be approximately bounded between 1 and 7 for low $P_\pi$ at Gbps rates given the typical value for γ is 0.3 GHz/mA. Since the switching power for a single directly driven laser varies inversely with the square of γ, reduction of switching power may be obtained by designing lasers with larger γ values: an increase by a factor of two to 0.6 GHz/mA results in a 4× reduction in switching power. For lower rates (i.e., rates<~1 Gbps), the switching power which varies with the square of the rate becomes significantly lower and the upper bound on κ increases accordingly while maintaining acceptable drive levels. Once the drive levels are lower than the drive required for standard logic gates, there is little incentive from a power perspective for reducing the switching power further. However, at high rates, the switching power may be bounded by approximately $$\frac{\text{Rate}^2}{7} \leq P_\pi \leq 7\text{Rate}^2 \ [\text{mW}]. \quad (13)$$

For example, by selecting κ≈4 to represent a typical value, $P_{\pi\text{-}typ} \approx 2\text{Rate}^2$. Since the direct-drive switching power is proportional to the Rate squared, distributing the data transmission over multiple wavelengths using, for example, WDM, lowers the net drive power consumed. In this case, by dividing the desired Rate into M-WDM channels (using OOK, for example) the average switching power becomes $$\overline{P}_\pi^{M\text{-}WDM} = \left(\frac{\kappa}{\gamma}\right)^2 \frac{DC \cdot \text{Rate}^2}{80M} = \frac{(\kappa \text{Rate})^2}{14.4M} \ [\text{mW}], \quad (14)$$

so that the net drive power is reduced by a factor of M. Here, DC is the duty-cycle indicating the fraction of the time each laser is in the "on" state, which is 50% for OOK. The required switching current and voltage on each WDM channel $$i_\pi = \frac{\kappa \text{Rate}}{2M\gamma} = \frac{\kappa \text{Rate}}{0.6M} \approx \frac{7\text{Rate}}{M} \ [\text{mA}], \quad (15)$$

$$V_\pi = \frac{\kappa \text{Rate}}{40M\gamma} = \frac{\kappa \text{Rate}}{12M} = \frac{\text{Rate}}{3M} \ [\text{V}], \quad (16)$$

are similarly reduced by a factor of M so that the drive power per laser is reduced by a factor of $M^2$. In the right-hand terms in Eqs. (15) and (16), κ=4 and γ=0.3 GHz/mA have been substituted. This is useful because adjusting the number of WDM channels lowers the required drive power and voltage sufficiently to eliminate the need for external (and typically power hungry) drive circuitry—so that standard logic gates may be used to drive the lasers directly.

For example, consider a net data rate of 10 Gbps driven directly from electronics with drive voltages up to a maximum of 1V using 4 typical lasers each operating at 2.5 Gbps (with OOK modulation) through a filter with FSR=12.5 GHz (κ=5). In this example, the average switching power is limited to ½×(20 mW/laser)×(4 lasers)=40 mW, which is better than 40 times lower than the average power required by relatively efficient drivers that support 2 V levels at rates up to 10 Gbps. FIG. 21 shows a graph illustrating the relationships between laser current, drive voltage, and net switching power and net channel rate for various values of κ.

Using this approach, Eq. (16) may be rearranged to $$V_{max} = \frac{R_\Omega \kappa}{2000\gamma}\left(\frac{\text{Rate}}{M}\right) \text{ or } \frac{\text{Rate}}{M} = V_{max}\frac{2000\gamma}{R_\Omega \kappa} \quad (17)$$

where the ratio (Rate/M) is adjusted to maintain the maximum voltage constraints as the Rate is increased, converging to a constant ratio given by the right-hand-side of Eq. (17). In this regime, the average switching power for M lasers is bounded by $$\overline{P}_\pi^{M\text{-}WDM} = \frac{DC \cdot M\left(V_{max}\frac{2000}{R_\Omega}\right)^2}{80}$$

$$= 20DC \cdot MV_{max}^2$$

$$= \frac{DC \cdot V_{max}}{2}\left(\frac{\kappa}{\gamma}\right)\text{Rate} \ [\text{mW}],$$

The average switching energy per bit is given by $$\overline{E}_\pi = \frac{P_\pi}{\text{Rate}} \quad (18)$$

$$= \frac{DC}{80}\left(\frac{\kappa}{\gamma}\right)^2\left(\frac{\text{Rate}}{M}\right)\left[\frac{\text{mW}}{\text{Gbit/s}}\right]$$

or equivalently $\left[\frac{pJ}{\text{bit}}\right]$.

Substituting the fixed ratio for (Rate/M) from the right-hand side of Eq. (17) into Eq. (18) yields $$\overline{E}_\pi^{upperbound} = \frac{DC}{80}\left(\frac{\kappa}{\gamma}\right)^2\left(V_{max}\frac{2000\gamma}{R_\Omega \kappa}\right) = \frac{DC \cdot V_{max}}{2}\left(\frac{\kappa}{\gamma}\right)\left[\frac{pJ}{\text{bit}}\right], \quad (19)$$

which shows that the switching energy for this approach is independent of Rate and is proportional to the ratio of constants (κ/γ) and the selection of $V_{max}$, which may, in principle, be made arbitrarily low using this approach. Note that the results in Eq. (19) are very different than the general case given in Eq. (18), in which $E_\pi$ is proportional to the product of the Rate and the square of the ratio (κ/γ). FIG. 22 shows graphs that illustrate the relationship between switching energy and channel rate for both the single-channel TX (left) and the WDM TX (right). The graphs in FIG. 22 correspond to the power curves $P_\pi = P_\pi(\text{Rate}, \kappa)$ illustrated in FIG. 21 normalized by the net Rate.

Note that for the parameters used in the last example (κ=5, γ=0.3 GHz/mA, Rate=10 Gbps, M=4, $V_{max}$=1 V), the required switching voltage is actually $V_\pi=1.04$ V, 4% more than the maximum available. One option to fix is to increase the number of lasers to 5, reducing the switching voltage to 0.83 V. However, as shown in FIGS. 5, 7, 19, and 20, proper selection of the filter results in the desired ER performance despite the 4% error due to limited drive voltage. For instance, using filters with a single-pass, 2-pass, and 4-pass DI transfer functions results in ERs of ~20 dB, ~40 dB, and >40 dB, respectively, illustrating a benefit of having a wide filter rejection band.

The total average power required to drive the M direct-drive lasers includes both the switching power and the steady-state power ($P_{bias}$) required for biasing the lasers, or $$\overline{P}_{total}^{M\text{-}WDM} = \overline{P}_\pi^{M\text{-}WDM} + P_{bias} = 20DC \cdot MV_{max}^2 + M \cdot i_{bias} V_{bias} [\text{mW}]. \quad (20)$$

Using a low bias current with this direct-drive approach is useful for keeping the total power low, and, as shown in FIG. 3, improving the unfiltered intensity modulation contribution to the net ER. For instance, using a 40 mA bias with a 20 mA drive current provides about a 5 dB ER due to the AM, so that a net ER of 20 dB is achieved with only 15 dB improvement due to the filtering. Such low bias currents may be sourced from a bias voltage supply of 1.5 V for commonly used direct-drive lasers, so that the bias power per laser may be as low as ~60 mW, which is six times the average switching power per laser. Nevertheless, the total average power for this 10 Gbps, 4-channel, filtered, direct-drive example is less than 300 mW, about an order of magnitude lower than the power required for driving using conventional techniques.

In addition to using M-WDM OOK channels to reduce drive power requirements, other parallelizable modulation formats, such as WDM-PPM and M-FSK, may leverage multiple TXs in a similar manner to reduce the net drive power requirements. With M-WDM, M independent channels broadcast an aggregate of M-bits per symbol period, which each channel transmitting at a symbol rate of Rate/M. In contrast, for M-FSK implemented with M TXs (with each TX representing a different frequency symbol), each symbol period contains $k=\log_2(M)$ bits, so that the symbol rate may be reduced to Rate/k.

Reusing the previous example with a net data rate of 10 Gbps, this may be implemented with an M-FSK TX and 1V electronics using 16 directly-driven AM/FSK laser sources operating at a 2.5 Gsym/s rate through a filter with FSR=12.5 GHz ($\kappa$=5). In this case, the average switching power required given in Eqs. (14) and still apply, but now both M and DC are 16, so that the average switching power is ($\frac{1}{16}$)×(20 mW/laser)×(16 lasers)=20 mW, half of that needed for the OOK TX. However, as in the OOK example, the bias power still dominates, but with 16 laser sources the total power is about four times larger than the WDM-OOK example.

While this invention has been particularly shown and described with references to example embodiments thereof, it will be understood by those skilled in the art that various changes in form and details may be made therein without departing from the scope of the invention encompassed by the appended claims.

What is claimed is:

1. An optical transmitter, comprising:
   a laser configured to generate an output signal as a function of power of a drive signal, with a pulse duration, used to control power and wavelength shift of the output signal, the wavelength shift corresponding to the power of the drive signal; and
   a filter with a free spectral range (FSR) greater than a reciprocal of the pulse duration and approximately twice a frequency shift of the output signal caused by the drive signal.

2. The transmitter of claim 1 wherein the filter has an FSR dependent on the drive signal and electrical and optical characteristics of the laser, and wherein the filter further has a rejection bandwidth with a first percentage of the FSR and a pass bandwidth with a second percentage of the FSR, the first percentage being greater than 6% of the FSR and the second percentage being greater than 6% of the FSR.

3. The transmitter of claim 2 wherein the filter has at least a 20 dB rejection bandwidth with a first percentage of the FSR and at least a 0.2 dB pass bandwidth with a second percentage of the FSR.

4. The transmitter of claim 1 wherein the filter has an FSR dependent on the drive signal and electrical and optical characteristics of the laser, and wherein the filter further has a rejection bandwidth with a first percentage of the FSR and a pass bandwidth with a second percentage of the FSR, the first percentage being greater than 20% of the FSR.

5. The transmitter of claim 4 wherein the filter includes a multi-pass optical delay line interferometer.

6. The transmitter of claim 5 wherein the multi-pass optical delay line interferometer includes a single-pass delay line and a reflecting element.

7. The transmitter of claim 6 wherein the reflecting element includes a Faraday rotation element.

8. The transmitter of claim 6 wherein the output signal has a single polarization.

9. The transmitter of claim 4 wherein the transmitter is configured to control an alignment of the output wavelength and a pass band of the filter using a pilot tone.

10. The transmitter of claim 6 wherein the transmitter is configured to control an alignment of an on-state wavelength and a pass band of the filter, and an off-state wavelength and a rejection band of the filter using a dither of the drive signal or bias current as feedback to adjust the drive signal power and bias current.

11. The transmitter of claim 1 wherein the filter is a quadruple-pass optical delay line interferometer.

12. The transmitter of claim 11 wherein the transmitter is configured to control an alignment of the output wavelength and a pass band of the filter using a pilot tone.

13. The transmitter of claim 1 wherein the filter includes an arrayed waveguide grating (AWG) or fiber Bragg grating.

14. The transmitter of claim 1 further comprising a carver configured to operate on an output of the filter.

15. The transmitter of claim 1 wherein the laser is a semiconductor laser.

16. The transmitter of claim 1 wherein the optical output power off to on extinction ratio (ER) is better than −20 dB (1:100).

17. The transmitter of claim 16 wherein switching power of the drive signal is less than 20 mW.

18. The transmitter of claim 1 wherein the laser includes plural lasers, each configured to emit light at one of a plurality of wavelengths.

19. The transmitter of claim 18 wherein the ER for each laser is less than −20 dB.

20. The transmitter of claim 19 wherein an average switching power of the drive signal is less than 20 mW.

21. The transmitter of claim 18 wherein at least one of the transmitters is configured to transmit OOK, M-PPM, M-FSK, M-orthogonal, PoLSK, M-DPSK, or variable duty cycle waveforms.

22. The transmitter of claim 18 wherein the lasers are configured to align to an individual filter passband and wherein the filter is tuned to compensate for an average ambient temperature change influence on the wavelengths emitted by the lasers.

23. The transmitter of claim 22 wherein the filter is configured to be tuned by approximately 0.1 nm/deg C ambient change.

24. The transmitter of claim 18 wherein the plural lasers are configured to be dynamically activated.

25. The transmitter of claim 18 wherein the plural lasers are configured to be selectably activated.

26. The transmitter of claim 18 wherein at least one of the plural lasers is configured to transmit different data or the same data as at least one other of the plural lasers.

27. The transmitter of claim 26 wherein configuration of the at least one of the plural lasers is a function of channel characteristics through which the output signal is to be transmitted.

28. A method for transmitting optical signals, comprising:
generating an output signal as a function of power of a drive signal, with a pulse duration, used to control power and wavelength shift of the output signal, the wavelength shift corresponding to the power of the drive signal; and
filtering the output signal as a function of a free spectral range (FSR) greater than a reciprocal of the pulse duration and approximately twice a frequency shift of the output signal caused by the drive signal.

29. The method of claim 28 wherein the filtering depends on the drive signal and electrical and optical characteristics of the laser, and wherein a rejection bandwidth of the filtering further depends on a first percentage of the FSR and a pass bandwidth of the filtering further depends a second percentage of the FSR, the first percentage being greater than 6% of the FSR and the second percentage being greater than or equal to 6% of the FSR.

30. The method of claim 28 wherein the rejection bandwidth has at least a 20 dB rejection bandwidth and wherein the pass bandwidth has at least a 0.2 dB pass bandwidth.

31. The method of claim 28 wherein the filtering depends on the drive signal and electrical and optical characteristics of the laser, and wherein a rejection bandwidth of the filtering further depends on a first percentage of the FSR and a pass bandwidth of the filtering further depends a second percentage of the FSR, the first percentage being greater than 20% of the FSR.

32. The method of claim 28 wherein the filtering is provided by delaying and interfering an optical signal, used to produce the output signal, multiple times.

33. The method of claim 32 further including reflecting the optical signal used to produce the output signal.

34. The method of claim 33 wherein the reflecting includes Faraday rotating the optical signal used to produce the output signal.

35. The method of claim 33 wherein the output signal has a single polarization.

36. The method of claim 33 wherein the transmitting includes controlling an alignment of the output wavelength and a pass band of the filter using a pilot tone.

37. The method of claim 33 wherein the transmitting includes controlling an alignment of an on-state wavelength and a pass band of the filtering and further includes controlling an alignment an off-state wavelength and a rejection band of the filtering using a dither of the drive signal or bias current as feedback to adjust the drive signal power and bias current.

38. The method of claim 28 wherein the filtering is provided by delaying and interfering an optical signal used to produce the output signal in a quadruple-pass manner.

39. The method of claim 38 wherein the transmitting includes controlling an alignment of the output wavelength and a pass band of the filter using a pilot tone.

40. The method of claim 28 wherein the filtering is provided by passing an optical signal, used to produce to output signal, through an arrayed waveguide grating (AWG) or fiber Bragg grating.

41. The method of claim 28 further comprising carving an output of the filtering.

42. The method of claim 28 wherein generating the output signal includes activating a semiconductor laser.

43. The method of claim 28 wherein generating the output signal includes generating plural optical signals at a plurality of wavelengths.

44. The method of claim 43 wherein generating the output signal includes dynamically activating at least one of the plural optical signals.

45. The method of claim 43 wherein generating the output signal includes selectably activating at least one of the plural optical signals.

46. The method of claim 43 wherein generating the output signal includes configuring at least one of plural optical signals to transmit different data or the same data as at least one other of the plural optical signals.

47. The method of claim 46 wherein configuring the at least one of multiple optical signals is performed as a function of channel characteristics through which the output signal is to be transmitted to a receiver.

48. An optical transmitter, comprising:
means for generating an output as a function of a power of a drive signal, with a pulse duration, used to control the output power and output wavelength shift, the output wavelength shift corresponding to the power of the drive signal; and
means for filtering the output with a free spectral range (FSR) greater than a reciprocal of the pulse duration and approximately twice the frequency shift caused by the drive signal.

* * * * *